US012804405B2

(12) United States Patent
Farag

(10) Patent No.: US 12,804,405 B2
(45) Date of Patent: Nov. 17, 2026

(54) RESOURCE SELECTION FOR SIDELINK

(71) Applicant: Samsung Electronics Co., Ltd., Suwon-si (KR)

(72) Inventor: Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 18/332,548

(22) Filed: Jun. 9, 2023

(65) Prior Publication Data

US 2023/0319578 A1 Oct. 5, 2023

Related U.S. Application Data

(63) Continuation of application No. 17/169,296, filed on Feb. 5, 2021, now abandoned.

(60) Provisional application No. 63/054,031, filed on Jul. 20, 2020, provisional application No. 62/991,241, (Continued)

(51) Int. Cl.
*H04W 16/02* (2009.01)
*H04W 72/044* (2023.01)
*H04W 74/08* (2009.01)

(52) U.S. Cl.
CPC ......... *H04W 16/02* (2013.01); *H04W 72/044* (2013.01); *H04W 74/08* (2013.01)

(58) Field of Classification Search
None
See application file for complete search history.

(56) References Cited

U.S. PATENT DOCUMENTS 10,611,322 B2 4/2020 Agiwal
11,259,274 B2 2/2022 Hoang et al.
11,553,503 B2 1/2023 Parron et al.
(Continued)

FOREIGN PATENT DOCUMENTS

CN 110351858 A 10/2019
CN 110447294 A 11/2019
(Continued)

OTHER PUBLICATIONS

"3rd Generation Partnership Project; Technical Specification Group Radio Access Network; NR; Physical channels and modulation (Release 16)", 3GPP TS 38.211 v16.4.0, Dec. 2020, 133 pages.
(Continued)

*Primary Examiner* — Saumit Shah

(57) ABSTRACT

Sidelink (SL) resource selection includes determining that all SL resources within an SL resource pool for an SL resource selection window are unclaimed for SL transmission when no prior sensing results are available for an SL channel, and determining which SL resources within the SL resource pool are unclaimed for SL transmission based on the prior sensing results when prior sensing results are available. Unclaimed SL resource(s) are randomly selected, and the SL channel is sensed during one or more slots preceding the randomly selected SL resource(s) to determine availability before transmitting on or signaling the randomly selected SL resource(s). Transmission on a first-in-time of the randomly selected SL resource(s) is based on the availability determination and, in the first-in-time randomly selected SL resource, one or more additional SL resource(s) are signaled based on the availability determination.

14 Claims, 18 Drawing Sheets

Related U.S. Application Data filed on Mar. 18, 2020, provisional application No. 62/972,965, filed on Feb. 11, 2020.

(56) References Cited

U.S. PATENT DOCUMENTS

| | | | | |
|---|---|---|---|---|
| 11,647,540 | B2 | 5/2023 | Lee et al. | |
| 2019/0350045 | A1 | 11/2019 | Lee | |
| 2020/0229171 | A1 | 7/2020 | Khoryaev | |
| 2020/0296690 | A1 | 9/2020 | Lee et al. | |
| 2021/0144726 | A1 | 5/2021 | Hui | |
| 2021/0243749 | A1 * | 8/2021 | Hoang | H04W 72/02 |
| 2021/0250772 | A1 | 8/2021 | Farag | |
| 2021/0400650 | A1 | 12/2021 | Shilov | |
| 2022/0078758 | A1 | 3/2022 | Lee et al. | |
| 2022/0256553 | A1 * | 8/2022 | Lin | H04W 72/566 |
| 2022/0312479 | A1 | 9/2022 | Farag | |
| 2022/0386284 | A1 | 12/2022 | Zhao | |
| 2023/0028889 | A1 | 1/2023 | Kim et al. | |
| 2023/0080157 | A1 | 3/2023 | Ko et al. | |
| 2023/0128828 | A1 | 4/2023 | Ko et al. | |
| 2023/0254898 | A1 | 8/2023 | Cheng et al. | |
| 2024/0080805 | A1 | 3/2024 | Lee | |

FOREIGN PATENT DOCUMENTS

| | | | |
|---|---|---|---|
| WO | 2017222280 | A1 | 12/2017 |
| WO | 2019028841 | A1 | 2/2019 |
| WO | 2019066706 | A1 | 4/2019 |
| WO | 2020063130 | A1 | 4/2020 |

OTHER PUBLICATIONS

"3rd Generation Partnership Project; Technical Specification Group Radio Access Network; NR; Multiplexing and channel coding (Release 16)", 3GPP TS 38.212 v16.4.0, Dec. 2020, 152 pages.

"3rd Generation Partnership Project; Technical Specification Group Radio Access Network; NR; Physical layer procedures for control (Release 16)", 3GPP TS 38.213 v16.4.0, Dec. 2020, 181 pages.

"3rd Generation Partnership Project; Technical Specification Group Radio Access Network; NR; Physical layer procedures for data (Release 16)", 3GPP TS 38.214 v16.4.0, Dec. 2020, 169 pages.

"3rd Generation Partnership Project; Technical Specification Group Radio Access Network; NR; Medium Access Control (MAC) protocol specification (Release 16)", 3GPP TS 38.321 v16.3.0, Dec. 2020, 156 pages.

"3rd Generation Partnership Project; Technical Specification Group Radio Access Network; NR; Radio Resource Control (RRC) protocol specification (Release 16)", 3GPP TS 38.331 v16.3.1, Jan. 2021, 932 pages.

"3rd Generation Partnership Project; Technical Specification Group Radio Access Network; Evolved Universal Terrestrial Radio Access (E-UTRA); Physical layer procedures (Release 16)", 3GPP TS 36.213 v16.4.0, Dec. 2020, 575 pages.

"WID revision: NR Sidelink enhancement," LG Electronics, 3GPP TSG RAN Meeting #88e, RP-201385, Electronic Meeting, Jun. 29-Jul. 3, 2020, 6 pages.

International Search Report and Written Opinion of the International Searching Authority in connection with International Application No. PCT/KR2021/001844 issued May 31, 2021, 8 pages.

Oppo, "Discussions on resource reservation, sensing and selectioninMode 2", 3GPP TSG-RAN WG1 Meeting #98bis, R1-1910379, Chongqing, China, Oct. 14-20, 2019, 12 pages.

Fujitsu, "Dynamic Resource Selection for NR Sidelink", 3GPP TSG RAN WG1 #99, R1-1912079, Reno, USA, Nov. 18-22, 2019, 17 pages.

NTT Docomo, Inc., "Sidelink resource allocation mechanism mode 2 for NR V2X", 3GPP TSG RAN WG1 #99, R1-1912882, Reno, US, Nov. 18-22, 2019, 7 pages.

Intel Corporation, "Sidelink Resource Allocation Design for NR V2X Communication", 3GPP TSG RAN WG1 Meeting #96bis, R1-1904296, Xian, China, Apr. 8-12, 2019, 15 pages.

Extended European Search Report issued May 11, 2023 regarding Application No. 21753331.4, 12 pages.

Intel Corporation, "Resource Allocation Mode-2 for NR V2X Sidelink Communication", 3GPP TSG RAN WG1 Meeting #98bis, R1-1910650, Oct. 2019, 28 pages.

Oppo, "Discussions on resource reservation, sensing and selection in Mode 2", 3GPP TSG-RAN WG1 Meeting #99, R1-1912794, Nov. 2019, 12 pages.

Intel Corporation, "Summary for AI 7.2.4.2.2 Mode-2 Resource Allocation", 3GPP TSG RAN WG1 Meeting #97, R1-1907699, May 2019, 26 pages.

Extended European Search Report issued Dec. 1, 2023 regarding Application No. 23196197.0, 12 pages.

Ericsson, "Resource allocation for Mode-2 transmissions", 3GPP TSG-RAN WGI Meeting #99, RI-1912599, Nov. 2019, 23 pages.

Vivo, "Discussion on mode 2 resource allocation mechanism", 3GPP TSG RAN WG1 #99 meeting, R1-1912022, Nov. 2019, 10 pages.

Intel Corporation, "Design of Resource Allocation Mode-2 for NR V2X Sidelink Communication", 3GPP TSG RAN WG1 Meeting #99, R1-1912205, Nov. 2019, 32 pages.

Intel Corporation, "UE-Autonomous Resource Allocation for NR V2X Sidelink Communication", 3GPP TSG RAN WG1 Meeting #98, R1-1908635, Aug. 2019, 28 pages.

USPTO, Notice of Allowance issued Sep. 28, 2024 regarding U.S. Appl. No. 17/654,763, 19 pages.

International Search Report and Written Opinion issued Jun. 30, 2022 regarding International Application No. PCT/KR2022/003826, 6 pages.

Moderator (Oppo), "FL summary for AI 8.11.1.1—resource allocation for power saving", 3GPP TSG RAN WG1 #104-e, R1-2101412, Jan. 2021, 91 pages.

Fujitsu, "Considerations on Partial Sensing and DRX in NR V2X", 3GPP TSG RAN WG1 Meeting #104-e , R1-2100745, Jan. 2021, 23 pages.

Apple, "Sidelink Resource Allocation for Power Saving", 3GPP TSG RAN WG1 #104-e, R1-2101357, Jan. 2021, 7 pages.

LG Electronics, "Discussion on resource allocation for power saving", 3GPP TSG RAN WG1 Meeting #104-e, R1-2100517, Jan. 2021, 20 pages.

Extended European Search Report issued Jul. 18, 2024 regarding Application No. 22771815.2, 11 pages.

USPTO, Office Action issued Jun. 4, 2024 regarding U.S. Appl. No. 17/654,763, 19 pages.

European Search Report dated Jan. 4, 2026, in connection with European Application No. 26154513.1, 8 pages.

Chinese National Intellectual Property Administration, Office Action issued Jul. 23, 2025 regarding Application No. 202180014111.6, 13 pages.

Office Action issued Mar. 11, 2026, in connection with European Patent Application No. 23196197.0, 9 pages.

* cited by examiner

Represents codepoints with length $L=S+1-K$
$M$ is the starting position of a second resource
$M$ is between 1 and $K$
There are $K$ such codepoints, with the starting position of a third resource between 1 and $K$
Denote these codepoints as: $\{(M,1),(M,2),\ldots,(M,K)\}$

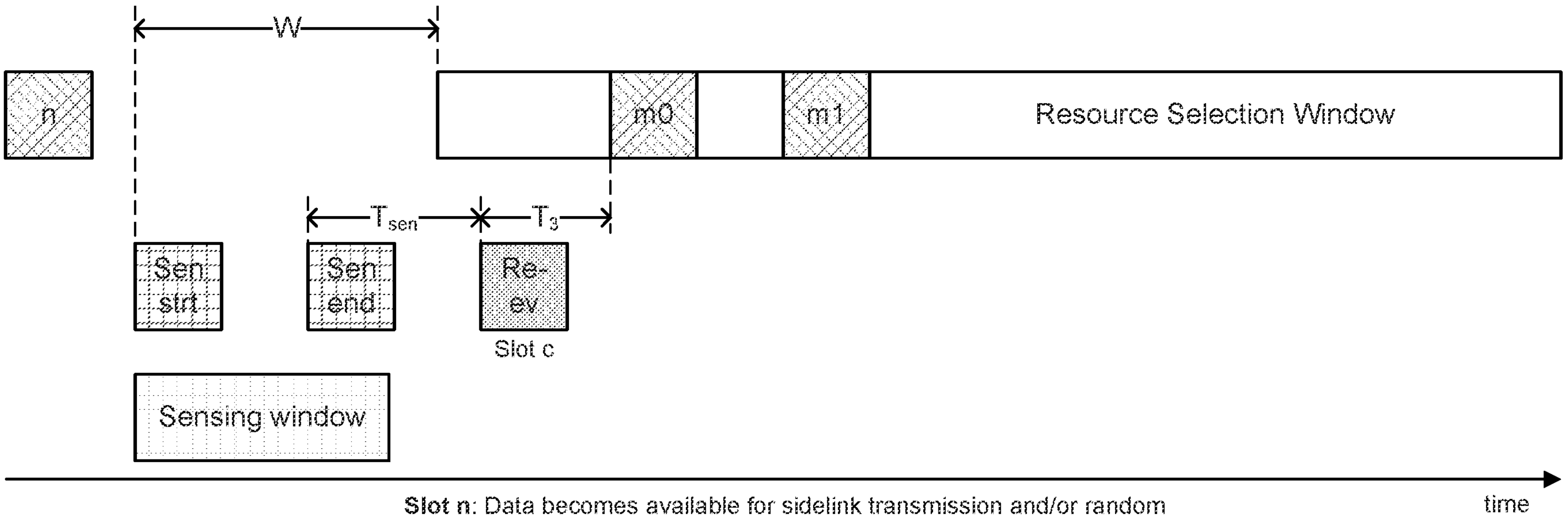

Slot n: Data becomes available for sidelink transmission and/or random resource selection process is triggered.
Slot m0: Slot of first-in-time randomly selected single-slot resource (initial transmission).
Slot m1: Slot of second-in-time randomly selected single-slot resource (for the next (re-)transmission on a previously signaled or reserved resource).
Re-ev: Slot for reevaluation check—this is slot c.
Sen end: Last slot of the sensing window.
Sen start: First slot of the sensing window.

FIG. 21

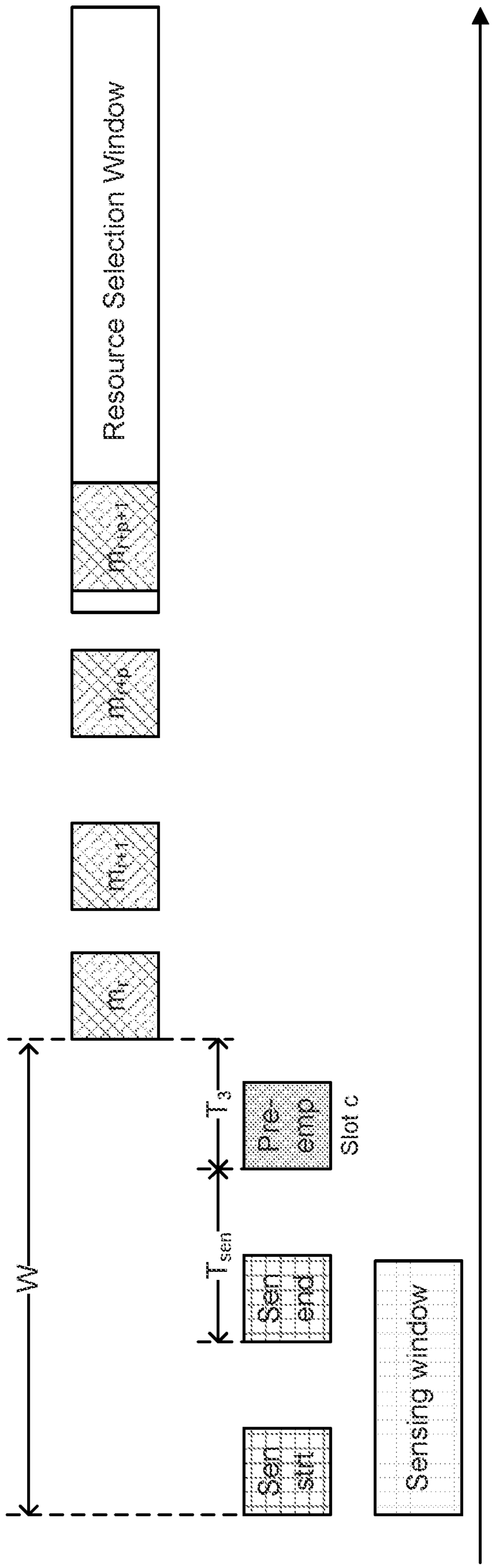

Slot $m_r$: Slot of first-in-time previously signaled/reserved single-slot resource.
Slot $m_{r+1}$: Slot of second-in-time signaled/reserved single-slot resource.
Slot $m_{r+p}$: Slot of last-in-time signaled/reserved single-slot resource.
Slot $m_{r+p+1}$: Slot of first-in-time randomly selected single-slot resource during this iteration of random procedure in slot c.
Pre-emp: Slot for preemption check—this is slot c.
Sen end: Last slot of the sensing window.
Sen start: First slot of the sensing window.

FIG. 22

RESOURCE SELECTION FOR SIDELINK

CROSS-REFERENCE TO RELATED APPLICATION AND CLAIM OF PRIORITY

This application is a continuation of U.S. patent application Ser. No. 17/169,296, filed on Feb. 5, 2021, which claims priority under 35 U.S.C. § 119(e) to U.S. Provisional Patent Application No. 62/972,965 filed Feb. 11, 2020, U.S. Provisional Patent Application No. 62/991,241 filed Mar. 18, 2020, and U.S. Provisional Patent Application No. 63/054,031 filed Jul. 20, 2020. The above-identified patent document(s) are incorporated herein by reference.

TECHNICAL FIELD

The present disclosure relates generally to communication systems, and more specifically, to random resource selection for sidelink transmission.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, “note pad” computers, net books, eBook readers, and machine type of devices. In order to meet the high growth in mobile data traffic and support new applications and deployments, improvements in radio interface efficiency and coverage are of paramount importance.

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a ‘Beyond 4G Network’ or a ‘Post LTE System’.

The 5G communication system is considered to be implemented in higher frequency (mmWave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large-scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

SUMMARY

Sidelink (SL) resource selection includes determining that all SL resources within an SL resource pool for an SL resource selection window are unclaimed for SL transmission when no prior sensing results are available for an SL channel, and determining which SL resources within the SL resource pool are unclaimed for SL transmission based on the prior sensing results when prior sensing results are available. Unclaimed SL resource(s) are randomly selected, and the SL channel is sensed during one or more slots preceding the randomly selected SL resource(s) to determine availability before transmitting on or signaling the randomly selected SL resource(s). Transmission on a first-in-time of the randomly selected SL resource(s) is based on the availability determination and, in the first-in-time randomly selected SL resource, one or more additional SL resource(s) are signaled based on the availability determination.

An SL transmission includes multiple segments, where one of: the segments are transmitted in parallel with a current transmission of a segment signals resources for one or more re-transmissions of the segment; the segments are transmitted sequentially with a current transmission of a segment signals resources for the one or more re-transmissions of the segment or transmissions of a new segment; or some of the segments of the SL transmission are transmitted in parallel and a remainder of the segments of the SL transmission are transmitted sequentially with a current transmission of a segment signals resources for the one or more re-transmissions of the segment or transmissions of a new segment.

Transmission on or signaling of an SL resource is on the randomly selected SL resource(s) when the availability determination is that the randomly selected SL resource(s) are available, and transmission on or signaling of the SL resource is on other SL resources when the availability determination of the availability is that one or more of the randomly selected SL resource(s) are one of reserved for another SL transmission, or preempted for another SL transmission. Random selection from the unclaimed SL resources and the determination of availability of the randomly selected SL resource(s) is performed iteratively until one of one or more of the unclaimed SL resources is determined to be available, or none of the unclaimed SL resources is determined to be available.

A check may be performed for preemption of the randomly selected SL resource(s) that have been signaled in a prior slot.

The randomly selected SL resource(s) comprise a plurality of SL resources including a first-in-time of the randomly selected SL resources and a plurality of remaining randomly selected SL resources that one of use randomly selected SL resources in time and frequency domains, use the same frequency resources as the first-in-time SL resource and use time resources based on a rule, use frequency resources based on a rule and use time resources based on a rule, use frequency resources based on a rule and use randomly selected time resources, or use randomly selected frequency resources and use time resources based on a rule. One or both of the rule for frequency resources and the rule for time resources may be specified by the system, may be configured by the system, or may be pre-configured for out-of-coverage operation of a user equipment, and one or both of the rule for frequency resources and the rule for time resources may depend on a user ID.

When an SL resource among the randomly selected SL resources is determined to be reserved for another transmission or preempted for another SL transmission, another SL resource may be randomly selected from available SL resources within the SL resource pool for the SL resource selection window, and remaining selected SL resources may comprise one or both of SL resource(s) from the randomly selected SL resources that were originally selected, or new SL resource(s) selected based on the other SL resource.

The prior sensing results for the SL channel that may be partial sensing results comprises results determined by sensing a selected number of the one or more slots during a sensing window, where slots selected for sensing are determined based on one or more of one or more periods associated with SL transmissions, or a discontinuous reception on-period.

SL resources within the SL resource pool may be partitioned based on one or more of an identifier for a user equipment, a data priority level, a service class for the user equipment, a zone identifier (where a user is located in a corresponding zone), or a location of the user equipment.

The randomly selected SL resources may satisfy time restrictions including one or more of: that a time separation between two consecutive ones of the randomly selected SL resources is not less than a minimum value; that a time separation between the two consecutive ones of the randomly selected SL resources is not more than a maximum value; that a time separation between one of the randomly selected SL resources and an nth consecutive one of the randomly selected SL resources is not more than a maximum value; that a first-in-time selected SL resource occurs within a maximum delay from a start of the SL resource selection window; that a first-in-time selected SL resource occurs within a maximum delay from a time of the random selection; or that a last-in-time selected SL resource occurs no earlier than a maximum delay from an end of the SL resource selection window.

SL resources for random selection by at least one user equipment are partitioned, and an indication of the partitioning of the SL resources is signaled. Partitioning of the SL resources is based on one or more of an identifier for a user equipment randomly selecting one or more of the SL resources, a data priority level for a transmission by the user equipment, a service class for the user equipment, a zone identifier of the user equipment, or a location of the user equipment.

Timing restrictions for SL resource selection may include one or more of: that a time separation between two consecutive ones of the SL resources is not less than a minimum value; that a time separation between the two consecutive ones of the SL resources is not more than a maximum value; that a time separation between one of the SL resources and an nth consecutive one of the SL resources is not more than a maximum value; that a first-in-time SL resource occurs within a maximum delay from a start of an SL resource selection window; that a first-in-time SL resource occurs within a maximum delay from a time of random selection from the partitioned SL resources; or that a last-in-time SL resource occurs no earlier than a maximum delay from an end of the SL resource selection window. The timing restrictions are signaled.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 21 and 22 illustrate timing of, respectively, random selection with reevaluation check of previously signaled/reserved single-slot resources and random selection with preemption check of previously signaled/reserved single-slot resources based on the examples presented in this disclosure.

DETAILED DESCRIPTION

Figure 1:
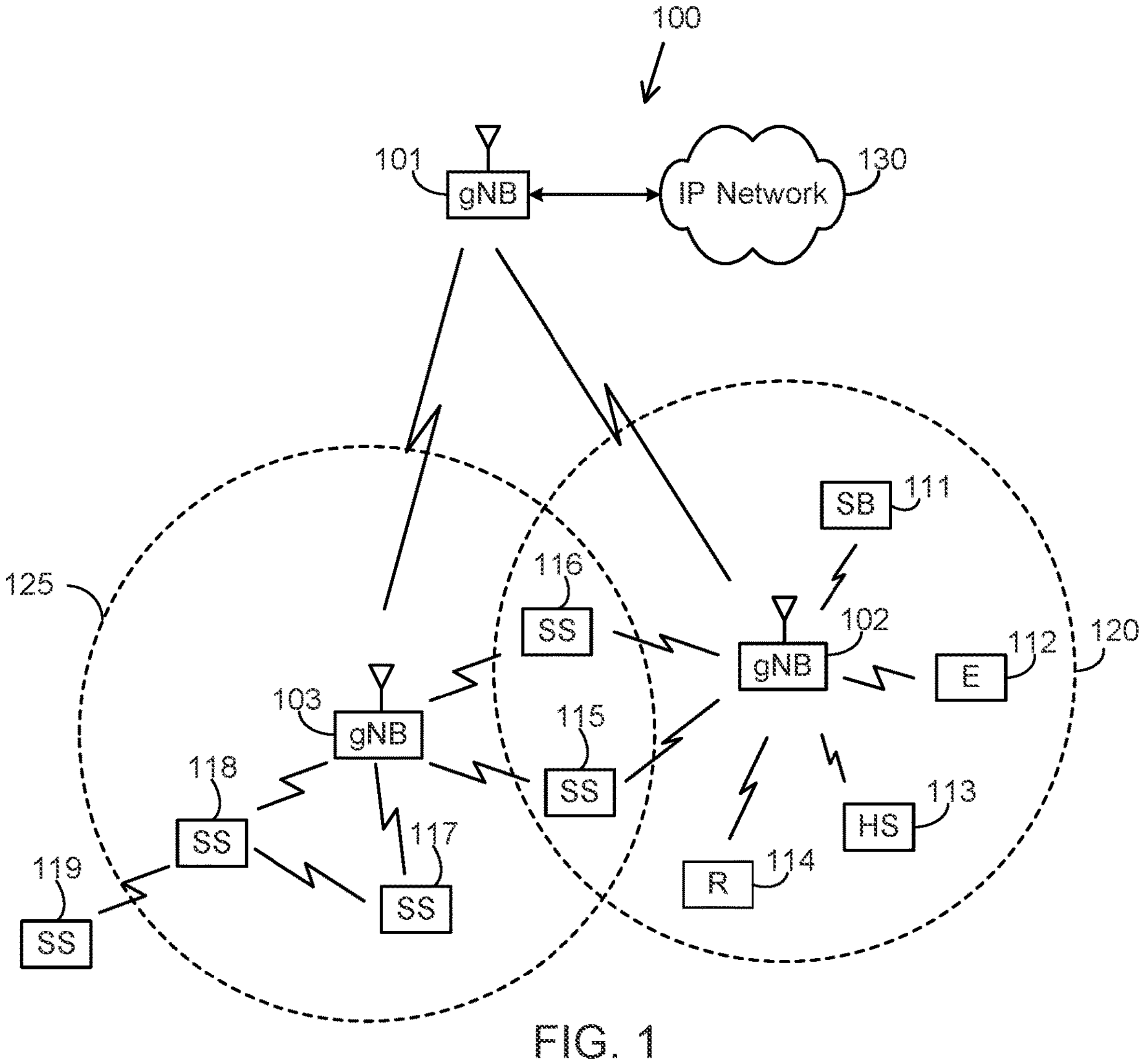
FIG. 1 illustrates an exemplary networked system according to various embodiments of this disclosure.

Aspects, features, and advantages of this disclosure are readily apparent from the following detailed description, simply by illustrating a number of particular embodiments and implementations. The subject matter of this disclosure is also capable of other and different embodiments, and several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

[1] 3GPP TS 38.211 v16.4.0, "NR; Physical channels and modulation."

[2] 3GPP TS 38.212 v16.4.0, "NR; Multiplexing and Channel coding."

[3] 3GPP TS 38.213 v16.4.0, "NR; Physical Layer Procedures for Control."

[4] 3GPP TS 38.214 v16.4.0, "NR; Physical Layer Procedures for Data."

[5] 3GPP TS 38.321 v16.3.0, "NR; Medium Access Control (MAC) protocol specification."

[6] 3GPP TS 38.331 v16.3.1, "NR; Radio Resource Control (RRC) Protocol Specification."

[7] 3GPP TS 36.213 v16.4.0, "Evolved Universal Terrestrial Radio Access (E-UTRA); Physical layer procedures."

[8] RP-201385, "NR Sidelink enhancement," LG Electronics, e-meeting July 2020.

The above-identified references are incorporated herein by reference.

| Abbreviations: | |
|---|---|
| 3GPP | 3rd Generation Partnership Project |
| ACK | acknowledgement |
| BS | base station |
| BW | bandwidth |
| BWP | bandwidth part |
| CORESET | control resource set |
| C-RNTI | cell radio network temporary identifier (RNTI) |
| CSI | channel state information |
| CSI-RS | channel state information reference signal |
| DCI | downlink control information |
| DL | downlink |
| DMRS | demodulation reference signal |
| eMTC | enhanced machine type communication |
| FDD | frequency division duplexing |
| gNB | base station (5G Node B) |
| HARQ | hybrid automatic repeat request (ARQ) |
| IoT | Internet of things |
| LSB | least significant bit |
| MCS | modulation and coding scheme |
| MSB | most significant bit |
| NR | New Radio |
| NTN | non-terrestrial networks |
| PBCH | primary broadcast channel |
| PCell | primary cell |
| PDCCH | physical downlink control channel |
| PDSCH | physical downlink shared channel |
| PSBCH | physical sidelink broadcast channel |
| PSCCH | physical sidelink control channel |
| PSFCH | physical sidelink feedback channel |
| PSSCH | physical sidelink shared channel |
| PUCCH | physical uplink control channel |
| PUSCH | physical uplink shared channel |
| RB | resource block |
| RNTI | radio network temporary identifier |
| RRC | radio resource control |
| RS | reference signal |
| SC | subcarrier |
| SCell | secondary cell |
| SCI | sidelink control information |
| SFCI | sidelink feedback control information |
| SIB | system information block |
| SINR | signal to interference and noise ratio |
| SL | sidelink |
| SRS | sounding reference signal |
| SS | synchronization signal |
| TB | transport block |
| TDD | time division duplexing |
| THz | Terahertz |
| TPC | transmit power control |
| UCI | uplink control information |
| UE | user equipment |
| UL | uplink |

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIG. 1 illustrates an example wireless network 100 according to this disclosure. The embodiment of the wireless network 100 shown in FIG. 1 is for illustration only. Other embodiments of the wireless network 100 can be used without departing from the scope of this disclosure.

The wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115, the UE 116, UE 117 and UE 118. In some embodiments, one or more of the gNBs 101-103 may communicate with each other and with the UEs 111-118 using 5G, long-term evolution (LTE), LTE-A, WiMAX, or other advanced wireless communication techniques. In some embodiments, multiple UEs, e.g., UE 117, UE 118 and UE 119 may communicate directly with each other through device-2-device communication. In some embodiments, a UE, e.g., UE 119, is outside the coverage area of the network, but can communicate with other UEs inside the coverage area of the network, e.g., UE 118, or outside the coverage area of the network.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include 2D antenna arrays as described in embodiments of the present disclosure. In some embodiments, one or more of gNB 101, gNB 102 and gNB 103 support the codebook design and structure for systems having 2D antenna arrays.

Although FIG. 1 illustrates one example of a wireless network 100, various changes may be made to FIG. 1. For example, the wireless network 100 can include any number of gNBs and any number of UEs in any suitable arrangement. Also, the gNB 101 can communicate directly with any number of UEs and provide those UEs with wireless broadband access to the network 130. Similarly, each gNB 102-103 can communicate directly with the network 130 (although the connection is not depicted in FIG. 1, to avoid overcomplicating that drawing) and provide UEs with direct wireless broadband access to the network 130. Further, the gNB 101, 102, and/or 103 can provide access to other or additional external networks, such as external telephone networks or other types of data networks. Furthermore, any number of UEs can communicate directly with each other using device-2-device communications, such UEs can be within network coverage of the same or different gNBs, outside of network coverage, or partially within network coverage where some UEs are within network coverage, while others are outside of network coverage.

Figure 2A:
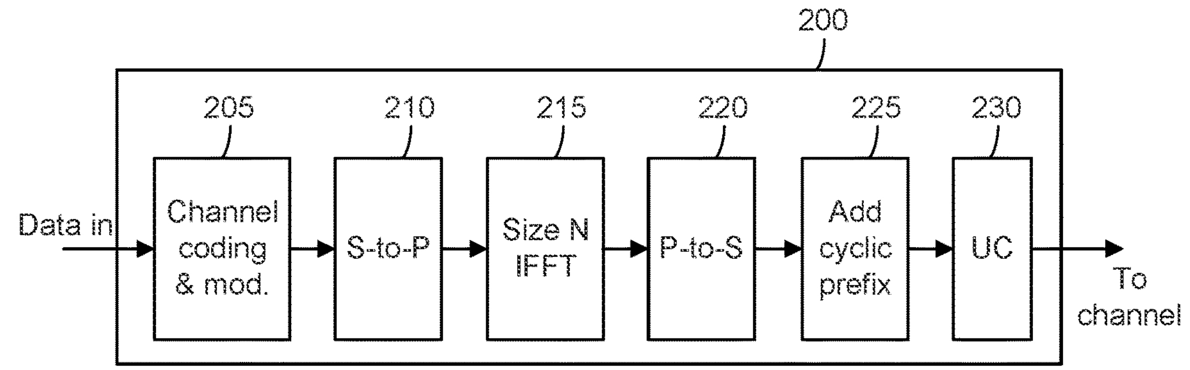
FIGS. 2A and 2B illustrate example wireless transmit and receive paths according to this disclosure.
Figure 2B:
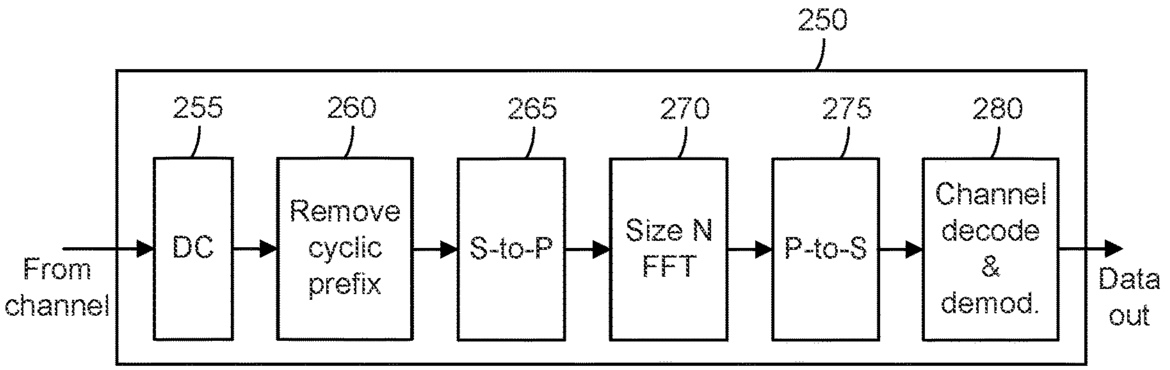

FIGS. 2A and 2B illustrate example wireless transmit and receive paths according to this disclosure. In the following description, a transmit path 200 may be described as being implemented in a gNB (such as gNB 102), while a receive path 250 may be described as being implemented in a UE (such as UE 116). However, it will be understood that the receive path 250 can be implemented in a gNB and that the transmit path 200 can be implemented in a UE. Furthermore, it will be understood that the receive path 250 can be implemented in one UE, and that the transmit path 200 can be implemented in another UE in case of device-2-device communication. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-116 and may implement a receive path 250 that is analogous to receiving in the uplink from UEs 111-118. Similarly, each of UEs 111-118 may implement a transmit path 200 for transmitting in the uplink to gNBs 101-103 and may implement a receive path 250 for receiving in the downlink from gNBs 101-103. Furthermore, each of UEs 111-119 may implement a transmit path 200 for transmitting in the sidelink to another one of UEs 111-119 and may implement a receive path 250 for receiving in the sidelink from another one of UEs 111-119.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B can be combined, further subdivided, or omitted and additional components can be added according to particular needs. Also, FIGS. 2A and 2B are meant to illustrate examples of the types of transmit and receive paths that can be used in a wireless network. Any other suitable architectures can be used to support wireless communications in a wireless network.

Figure 3:
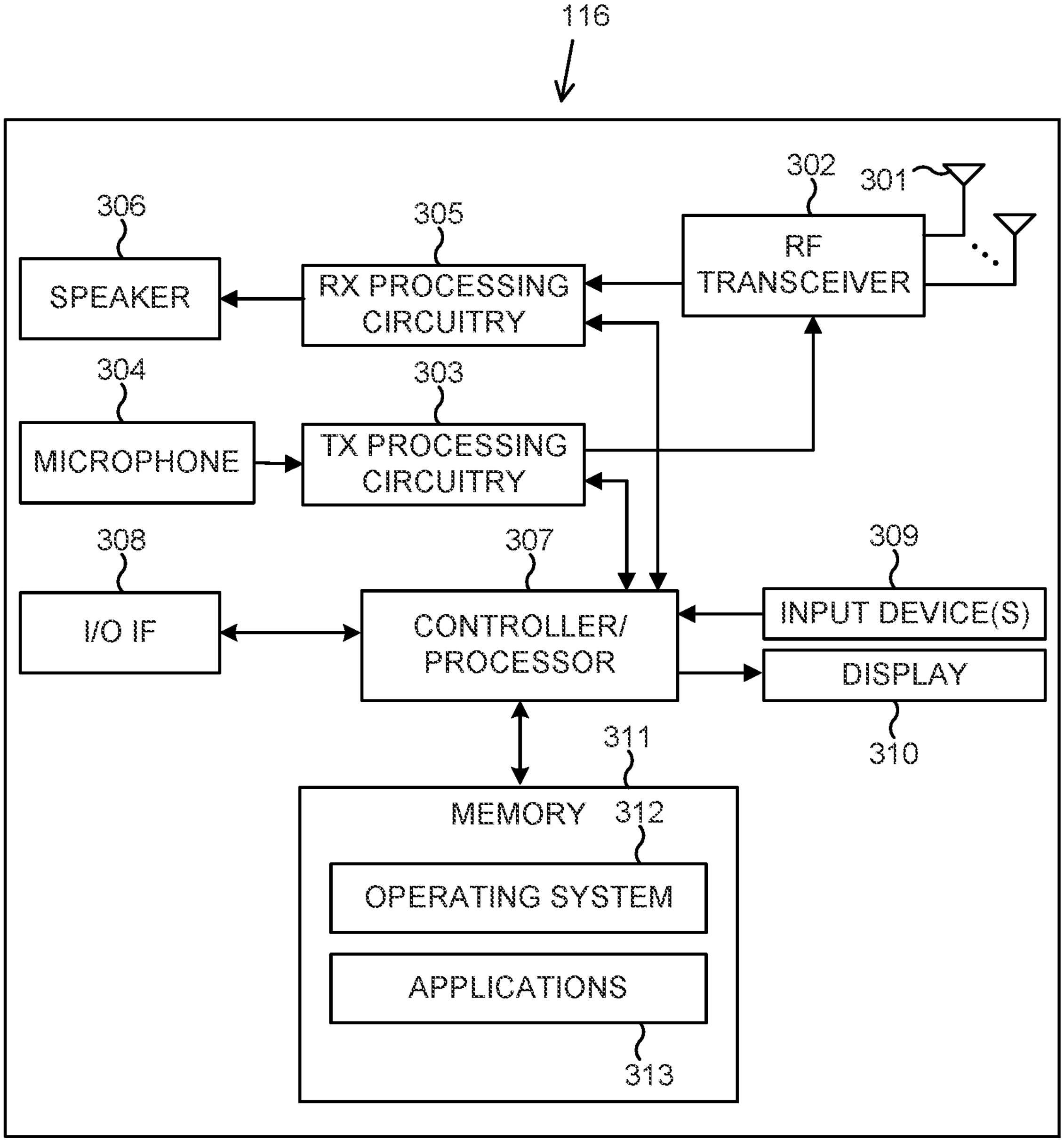
FIG. 3 illustrates an exemplary user device for communicating in the networked system according to various embodiments of this disclosure.

FIG. 3 illustrates an example UE 116 according to this disclosure. The embodiment of the UE 116 illustrated in FIG. 3 is for illustration only, and the UEs 111-115, 117-119 of FIG. 1 can have the same or similar configuration. However, UEs come in a wide variety of configurations, and FIG. 3 does not limit the scope of this disclosure to any particular implementation of a UE.

The UE 116 includes an antenna 301, a radio frequency (RF) transceiver 302, transmit (TX) processing circuitry 303, a microphone 304, and receive (RX) processing circuitry 305. The UE 116 also includes a speaker 306, a main processor (or "controller") 307, an input/output (I/O) interface (IF) 308, a keypad or other user input devices 309, a display 310 (which may be a touchscreen display), and a memory 311. The memory 31 includes a basic operating system (OS) program 312 and one or more applications 313.

The RF transceiver 302 receives, from the antenna 301, an incoming RF signal transmitted by an gNB of the network 100, or transmitted by another UE in case of device-2-device communication. The RF transceiver 302 down-converts the incoming RF signal to generate an intermediate frequency (IF) or baseband signal. The IF or baseband signal is sent to the RX processing circuitry 305, which generates a processed baseband signal by filtering, decoding, and/or digitizing the baseband or IF signal. The RX processing circuitry 305 transmits the processed baseband signal to the speaker 306 (such as for voice data) or to the main processor 307 for further processing (such as for web browsing data).

The TX processing circuitry 303 receives analog or digital voice data from the microphone 304 or other outgoing baseband data (such as web data, e-mail, or interactive video game data) from the main processor 307. The TX processing circuitry 303 encodes, multiplexes, and/or digitizes the outgoing baseband data to generate a processed baseband or IF signal. The RF transceiver 302 receives the outgoing processed baseband or IF signal from the TX processing circuitry 303 and up-converts the baseband or IF signal to an RF signal that is transmitted via the antenna 301.

The main processor 307 can include one or more processors, controllers or other processing devices and execute the basic OS program 312 stored in the memory 311 in order to control the overall operation of the UE 116. For example, the main processor 307 can control the reception of forward channel signals and the transmission of reverse channel signals, and/or the transmission and the reception of sidelink channel signals by the RF transceiver 302, the RX processing circuitry 305, and the TX processing circuitry 303 in accordance with well-known principles. In some embodiments, the main processor 307 includes at least one microprocessor or microcontroller.

The main processor 307 is also capable of executing other processes and programs resident in the memory 311, such as operations for channel quality measurement and reporting for systems having 2D antenna arrays as described in embodiments of the present disclosure. The main processor 307 can move data into or out of the memory 311 as required by an executing process. In some embodiments, the main processor 307 is configured to execute the applications 313 based on the OS program 312 and/or in response to signals received from gNBs or inputs received from an operator ("user"). The main processor 307 is also coupled to the I/O interface 308, which provides the UE 116 with the ability to connect to other devices such as laptop computers and handheld computers as well as sensors, cameras, actuators and other devices inside an automobile. The I/O interface 308 is the communication path between these accessories and the main processor/controller 307.

The main processor 307 is also coupled to the input device(s) 309 and the display 310 (which, as discussed above, may be a touchscreen display comprising both display and user input device). The operator of the UE 116 can use the input device(s) 309 and/or display 310 to enter data into the UE 116. The display 310 may be a liquid crystal display or other display capable of rendering text and/or at least limited graphics, such as from web sites. The memory 311 is coupled to the main processor 307. Part of the memory 307 can include a random access memory (RAM), and another part of the memory 307 can include a Flash memory or other read-only memory (ROM).

Although FIG. 3 illustrates one example of UE 116, various changes may be made to FIG. 3. For example, various components in FIG. 3 can be combined, further subdivided, or omitted and additional components can be added according to particular needs. As a particular example, the main processor 307 can be divided into multiple processors, such as one or more central processing units (CPUs) and one or more graphics processing units (GPUs). Also, while FIG. 3 illustrates the UE 116 configured as a mobile telephone or smartphone, UEs can be configured to operate as other types of mobile or stationary devices.

Figure 4:
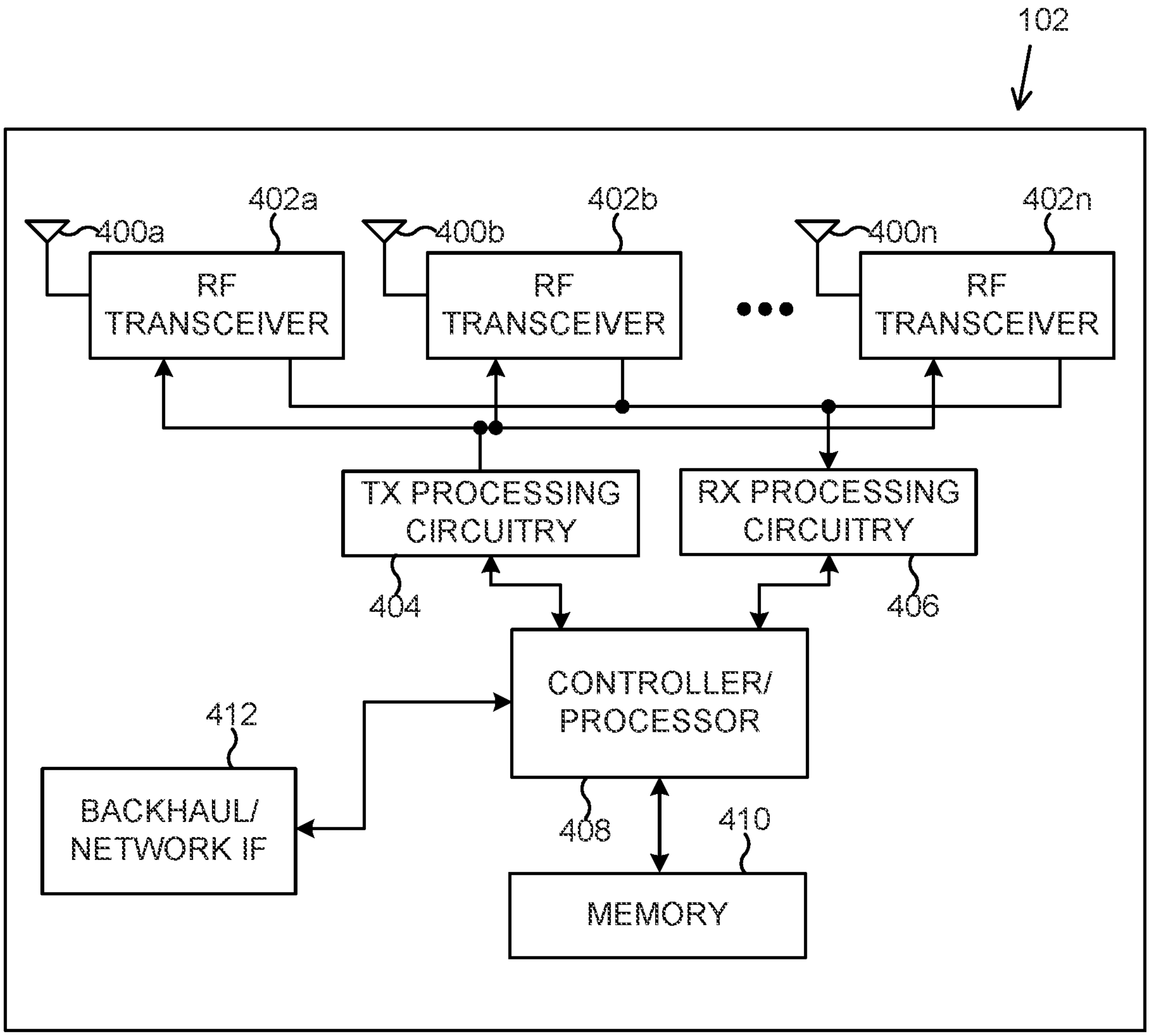
FIG. 4 illustrates an exemplary base station (BS) according to various embodiments of this disclosure.

FIG. 4 illustrates an example gNB 102 according to this disclosure. The embodiment of the gNB 102 shown in FIG. 4 is for illustration only, and other gNBs of FIG. 1 can have the same or similar configuration. However, gNBs come in a wide variety of configurations, and FIG. 4 does not limit the scope of this disclosure to any particular implementation of an gNB. It is noted that gNB 101 and gNB 103 can include the same or similar structure as gNB 102.

As shown in FIG. 4, the gNB 102 includes multiple antennas 400*a*-400*n*, multiple RF transceivers 402*a*-402*n*, transmit (TX) processing circuitry 404, and receive (RX) processing circuitry 406. In certain embodiments, one or more of the multiple antennas 400*a*-400*n* include 2D antenna arrays. The gNB 102 also includes a controller/processor 408, a memory 410, and a backhaul or network interface 412.

The RF transceivers 402*a*-402*n* receive, from the antennas 400*a*-400*n*, incoming RF signals, such as signals transmitted by UEs or other gNBs. The RF transceivers 402*a*-402*n* down-convert the incoming RF signals to generate IF or baseband signals. The IF or baseband signals are sent to the RX processing circuitry 406, which generates processed baseband signals by filtering, decoding, and/or digitizing the baseband or IF signals. The RX processing circuitry 406 transmits the processed baseband signals to the controller/processor 408 for further processing.

The TX processing circuitry 404 receives analog or digital data (such as voice data, web data, e-mail, or interactive video game data) from the controller/processor 408. The TX processing circuitry 404 encodes, multiplexes, and/or digitizes the outgoing baseband data to generate processed baseband or IF signals. The RF transceivers 402*a*-402*n* receive the outgoing processed baseband or IF signals from the TX processing circuitry 404 and up-converts the baseband or IF signals to RF signals that are transmitted via the antennas 400*a*-400*n*.

The controller/processor 408 can include one or more processors or other processing devices that control the overall operation of the gNB 102. For example, the controller/processor 408 can control the reception of forward channel signals and the transmission of reverse channel signals by the RF transceivers 402*a*-402*n*, the RX processing circuitry 406, and the TX processing circuitry 404 in accordance with well-known principles. The controller/processor 408 can support additional functions as well, such as more advanced wireless communication functions. For instance, the controller/processor 408 can perform the blind interference sensing (BIS) process, such as performed by a BIS algorithm, and decodes the received signal subtracted by the interfering signals. Any of a wide variety of other functions can be supported in the gNB 102 by the controller/processor 408. In some embodiments, the controller/processor 408 includes at least one microprocessor or microcontroller.

The controller/processor 408 is also capable of executing programs and other processes resident in the memory 410, such as a basic OS. The controller/processor 408 is also capable of supporting channel quality measurement and reporting for systems having 2D antenna arrays as described in embodiments of the present disclosure. In some embodiments, the controller/processor 408 supports communications between entities, such as web real time communication (RTC). The controller/processor 408 can move data into or out of the memory 410 as required by an executing process.

The controller/processor 408 is also coupled to the backhaul or network interface 412. The backhaul or network interface 412 allows the gNB 102 to communicate with other devices or systems over a backhaul connection or over a network. The interface 412 can support communications over any suitable wired or wireless connection(s). For example, when the gNB 102 is implemented as part of a cellular communication system (such as one supporting 5G, LTE, or LTE-A), the interface 412 can allow the gNB 102 to communicate with other gNBs over a wired or wireless backhaul connection. When the gNB 102 is implemented as an access point, the interface 412 can allow the gNB 102 to communicate over a wired or wireless local area network or over a wired or wireless connection to a larger network (such as the Internet). The interface 412 includes any suitable structure supporting communications over a wired or wireless connection, such as an Ethernet or RF transceiver.

The memory 410 is coupled to the controller/processor 408. Part of the memory 410 can include a RAM, and another part of the memory 410 can include a Flash memory or other ROM. In certain embodiments, a plurality of instructions, such as a BIS algorithm is stored in memory. The plurality of instructions is configured to cause the controller/processor 408 to perform the BIS process and to decode a received signal after subtracting out at least one interfering signal determined by the BIS algorithm.

As described in more detail below, the transmit and receive paths of the gNB 102 (implemented using the RF transceivers 402a-402n, TX processing circuitry 404, and/or RX processing circuitry 406) support communication with aggregation of frequency division duplex (FDD) cells and time division duplex (TDD) cells.

Although FIG. 4 illustrates one example of an gNB 102, various changes may be made to FIG. 4. For example, the gNB 102 can include any number of each component shown in FIG. 4. As a particular example, an access point can include a number of interfaces 412, and the controller/processor 408 can support routing functions to route data between different network addresses. As another particular example, while shown as including a single instance of TX processing circuitry 404 and a single instance of RX processing circuitry 406, the gNB 102 can include multiple instances of each (such as one per RF transceiver).

A time unit for DL signaling, for UL signaling, or for SL signaling on a cell is referred to as a slot and can include one or more symbols (e.g., 14 symbols). A slot can also be used as a time unit. A bandwidth (BW) unit is referred to as a resource block (RB). One RB includes a number of sub-carriers (SCs). For example, a slot can have duration of one millisecond (ms) and an RB can have a bandwidth of 180 kilohertz (KHz) and include 12 SCs with inter-SC spacing of 15 KHz. As another example, a slot can have a duration of 0.25 ms and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either a full DL slot, or a full UL slot, or a hybrid slot similar to a special subframe in time division duplex (TDD) systems (see also REF [1]). In addition, a slot can have symbols for SL communications. A UE can be configured one or more bandwidth parts (BWPs) of a system BW for transmissions or receptions of signals or channels.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

SL signals and channels are transmitted and received on sub-channels within a resource pool, where a resource pool is a set of time-frequency resources used for SL transmission and reception within an SL BWP. SL channels include physical SL shared channels (PSSCHs) conveying data information, physical SL control channels (PSCCHs) conveying SL control information (SCI) for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, and physical SL Broadcast channel (PSBCH) conveying system information to assist in SL synchronization. SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/stages corresponding to two respective SCI formats where, for example, the first SCI format is multiplexed on a PSCCH and the second SCI format is multiplexed along with SL data on a PSSCH that is transmitted in physical resources indicated by the first SCI format.

An SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-) configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format. In resource allocation mode 2, a UE schedules an SL transmission. SL transmissions can operate within network coverage where each UE is within the communication range of a gNB, outside network coverage where all UEs have no communication with any gNB, or with partial network coverage, where only some UEs are within the communication range of a gNB.

Sidelink Frequency Resource Assignment with $N_{MAX}$=3

A gNB transmits one or more of multiple types of RS including channel state information RS (CSI-RS) and demodulation RS (DMRS)—see also REF [1]. A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used (see also REF [3]). A CSI process consists of NZP CSI-RS and CSI-IM resources. A UE can determine CSI-RS transmission parameters through DL control signaling or higher layer signaling, such as radio resource control (RRC) signaling from a gNB (see also REF [5]). Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also REF [1]). A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the UE's buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs. A CSI report from a UE can include a channel quality indicator (CQI) informing a gNB of a largest modulation and coding scheme (MCS) for the UE to detect a data TB with a predetermined block error rate (BLER), such as a 10% BLER (see also REF [3]), of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH, see also REF [3] and REF [4]).

SL signals and channels are transmitted and received on sub-channels within a resource pool, where a resource pool is a set of time-frequency resources used for SL transmission and reception within an SL BWP. SL channels include physical SL shared channels (PSSCHs) conveying data information, physical SL control channels (PSCCHs) conveying SL control information (SCI) for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, and physical SL Broadcast channel (PSBCH) conveying system information to assist in SL synchronization. SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. The SCI can be split into two parts/stages corresponding to two respective SCI formats; the first SCI format is multiplexed on a PSCCH, while the second SCI format is multiplexed along with SL data on a PSSCH that is transmitted in physical resources indicated by the first SCI format.

A sidelink transmission can include resources for a current transmission, as well reservation for future transmissions. In this respect, the following agreements have been made:

Agreements in 3GPP Radio Access Network Work Group 1 (RAN1) Meeting #98 (RAN1 #98):

- At least for mode 2, the maximum number of SL resources $N_{MAX}$ reserved by one transmission including current transmission is [2 or 3 or 4]
  - Aim to select the particular number in RAN1 #98
- $N_{MAX}$ is the same regardless of whether HARQ feedback is enabled or disabled Agreements in email discussion [98b-NR-15] after RAN1 #98b:

- When reservation of a sidelink resource for an initial transmission of a TB at least by an SCI associated with a different TB is disabled, $N_{MAX}$ is 3
  - SCI signaling is designed to allow to indicate 1 or 2 or 3 resources at least of the same number of sub-channels with full flexibility in time and frequency position in a window W of a resource pool
    - For further study (FFS): if full flexibility is limited in some cases
  - Value 2 or 3 is (pre-)configured per resource pool
  - FFS size of window W Agreements in RAN1 #99:

- The first proposal under the Wednesday session in R1-1913450 is agreed, with one clarification that S is the number of sub-channels in the resource pool First proposal under Wednesday session in R1-193450:

- For mode 1 and mode 2, for the time-frequency resource indication in the SCI:
  - $N_{MAX}=2$
    - Frequency
      - $$\sum_{m=1}^{s}(S+1-m)=\frac{S(S+1)}{2}$$ codepoints, indicating starting sub-channel of the second resource and number of sub-channels of both resources
      - $$\left\lceil \log_2\left(\frac{S(S+1)}{2}\right)\right\rceil \text{bit}$$
    - Time
      - 1 codepoint indicates no reserved resource
      - 31 codepoints indicate different time position of the second resource within 32 slots
      - 5 bits
  - $N_{MAX}=3$
    - Frequency
      - Option 2-f-a: joint coding
        - $$\sum_{m=1}^{s}(S+1-m)^2=\frac{S(S+1)(2S+1)}{6}$$ codepoints indicating starting sub-channel of the second resource, starting sub-channel of the third resource, and the number of sub-channels of all resources
        - $$\left\lceil \log_2\left(\frac{S(S+1)(2S+1)}{6}\right)\right\rceil \text{ bit}$$
    - Time
      - Option 2-t-a: joint coding
        - 1 codepoint indicates no reserved resource
        - 31 codepoints indicate different time position of the second resource within 32 slots, when no third resource is reserved
        - 30+29+ . . . +1=465 codepoints indicate different time position of two resources within 32 slots
        - 9 bits This disclosure presents a method for joint encoding of a number of sub-channels L, the starting sub-channel of a second resource M, and the starting sub-channel of a third resource N. L is in the range of 1 . . . S, while M and N are in the range of 1 . . . S−L+1. For convenience of notation, we define K=S−L+1, hence M and N are in the range of 1 . . . K. S is the total number of sub-channels. The total number of codepoints is $$\frac{S(S+1)(2S+1)}{6}.$$

The present disclosure relates to a 5G/NR communication system.

The present disclosure relates to a method to generate the codepoints of a frequency resource assignment field of an SCI format (e.g., SCI format 0-1) with $N_{MAX}$=3, which includes the number of sub-channels L, a starting sub-channel index of a second resource M, and a starting sub-channel index of a third resource N. $N_{MAX}$ is the maximum number of SL resources reserved by one transmission including the current transmission.

The present disclosure relates to a method to decode the codepoint of a frequency resource assignment field of an SCI format (e.g., SCI format 0-1) with $N_{MAX}$=3, and provide the number of sub-channels L, a starting sub-channel index of a second resource M, and a starting sub-channel index of a third resource N.

When $N_{MAX}$=3, there are three values indicated by each codepoint;

- The number of sub-channels L. L is in the range of 1 . . . S, where S is the total number of sub-channels. For convenience of notation, we define K=S−L+1.
- The starting sub-channel of the second resource M. M is in the range of 1 . . . K.
- The starting sub-channel of the third resource N. N is in the range of 1 . . . K.

Figure 5:
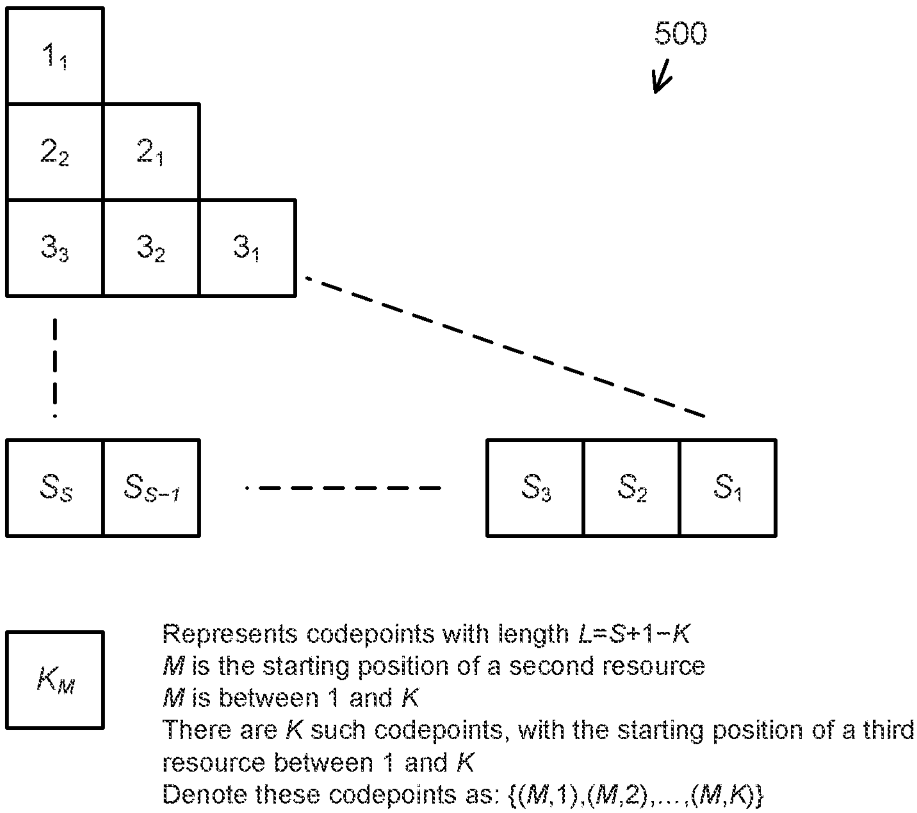
FIG. 5 illustrates an arrangement of code points for a predetermined maximum number of sidelink resources reserved for any one transmission ($N_{MAX}$=3), where each block (KM) can represent the codepoints with a given length (L=S+1−K) and starting at a particular sub-channel position (M) for a second resource.

FIG. 5 illustrates an arrangement of code points for $N_{MAX}$=3, where each block KM can represent the codepoints with length L=S+1−K and starting sub-channel position M for a second resource. M is in the range of 1 . . . K. S is the total number of sub-channels. Each block KM represents K codepoints with the starting sub-channel resource of the third resource, N, ranging from 1 . . . K.

Therefore, each block KM, represents the codepoints $\{(M, 1)_L, (M, 2)_L, \ldots, (M, K)_L\}$, where $(M, N)_L$ is a codepoint of length L sub-channels, and starting sub-channel position M for a second resource, and starting sub-channel position N for a third resource. Such that L=S+1−K.

It should be noted that while in this disclosure the starting sub-channel index of the second resource is assumed to be between 1 and K, the same principle applies if the starting sub-channel index of the second resource is between 0 and K−1, in this case, sub-channel index of the second resources is M−1.

Similarly, while in this disclosure the starting sub-channel index of the third resource is assumed to be between 1 and K, the same principle applies if the starting sub-channel index of the third resource is between 0 and K−1, in this case, sub-channel index of the second resources is N−1.

Figure 6:
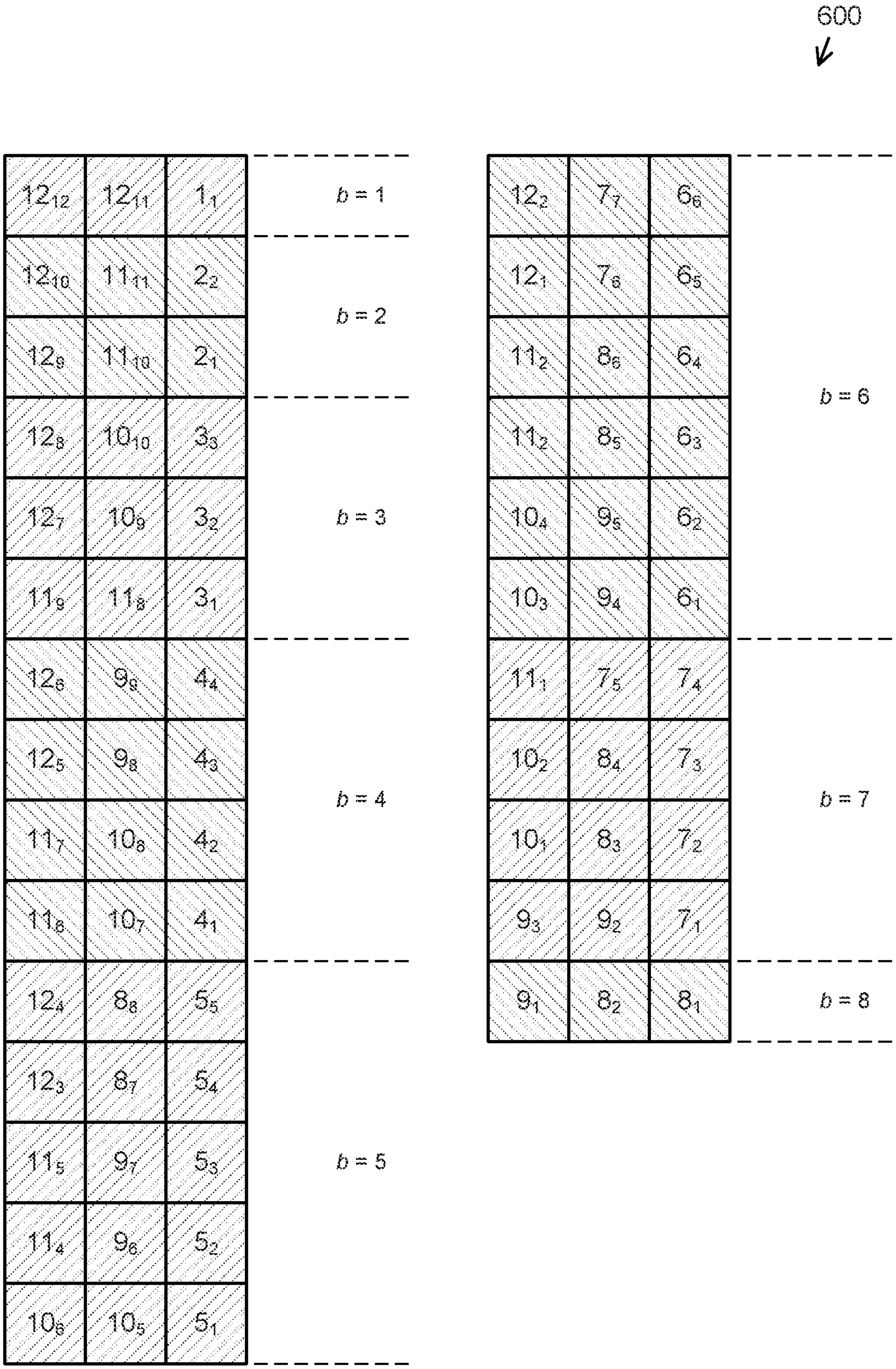
FIG. 6 illustrates an exemplary arrangement of codepoints in groups of one predetermined size (2S+1, where S=12 in the example shown)

To generate the codepoint values, the blocks of FIG. 1 are re-arranged into rows (groups), with each row having 2S+1 codepoints. The codepoints are then indexed sequentially in the new arrangement. FIG. 6 shows an example of how this can be done for S=12.

Each row represents a group of 2S+1 codepoints. In this example S=12, therefore, the group size is 25. Each group consists of three blocks that constitute the 2S+1 codepoints. The groups are arranged in super-groups, with each super-group designated by b. There are S(S+1)/6 rows (groups). In this example, when S=12, there are 26 rows (groups).

The algorithm starts by taking 2 blocks from the bottom part of FIG. 5, and 1 block from the top part of FIG. 5. The process continues iteratively moving towards the center of the diagram of FIG. 5 until all blocks have been include in the diagram of FIG. 6.

Super-group 1 consists of 1 row (1 group) containing the block of the top row of FIG. 5, and 2 blocks from the bottom row of FIG. 5. Notice in this case, when S=12, the size of the group is 12+12+1=25.

Super-group 2 consists of 2 rows (2 groups), each containing a block of the second row of FIG. 5 and each containing 2 blocks one from the last row and one from the second to last row of FIG. 5. Notice in this case, when S=12, the size of each group is 12+11+2=25.

Super-group 3 consists of 3 rows (3 groups), each containing a block of the second row of FIG. 5 and two of the rows containing each a block of the last row of FIG. 5, and a block of the third to last row of FIG. 5, and a third row containing 2 blocks from the second to last row of FIG. 5. Notice in this case, when S=12, the size of each group is 12+10+3=25 or 11+11+3=25.

For each super group with index b≤S/2, there are b rows (b groups), each group c (with c=0 . . . (b−1)) contains:

- 1 block from row b of FIG. 5,
- 1 block from row $S-\lfloor c/2 \rfloor$ of FIG. 5, and
- 1 block from row $S-(b-1)+\lfloor c/2 \rfloor$ of FIG. 5.

For super group with index b>S/2, the procedure continues as described above creating groups with 2S+1 codepoints that have 3 blocks each. The number of rows (groups) per super group can be given by: b'=b−(2(2b−S)−1)=2S+1−3b. Each row c within the super group, with c=1 . . . (b'−1), contains:

- 1 block from row b of FIG. 5, if any are remaining,
- 1 block from row $S-\lfloor (c+b'')/2 \rfloor$ if any are remaining, and
- 1 block from row $S-(b-1)+\lfloor (c+b'')/2 \rfloor$, if any are remaining, where b"=4b−(2S+1). It worth noting that b'=b−b", which is equivalent to removing the top b" rows of the super-group had that group contained b rows.

In one example, the blocks selected from a row of FIG. 5 are selected in order of decreasing value of M starting with the largest value, where higher value rows (groups) have a smaller value of M, as shown in FIG. 6.

In another examples, the blocks selected for a row of FIG. 5 are selected in order of increasing value of M starting with a value of M=1, where higher value rows (groups) have a larger value of M.

In one example, the blocks selected from a row of FIG. 5 for a first block in a row, e.g., of FIG. 6, are selected in order of decreasing value of M starting with the largest value, where higher value rows (groups) have a smaller value of M, as shown in FIG. 6.

In another example, the blocks selected from a row of FIG. 5 for a first block in a row, e.g., of FIG. 6, are selected in order of increasing value of M starting with a value of M=1, where higher value rows (groups) have a larger value of M.

In one example, the blocks selected from a row of FIG. 5 for a second block in a row, e.g., of FIG. 6, are selected in order of decreasing value of M starting with the largest value, where higher value rows (groups) have a smaller value of M, as shown in FIG. 6.

In another example, the blocks selected from a row of FIG. 5 for a second block in a row, e.g., of FIG. 6, are selected in order of increasing value of M starting with a value of M=1, where higher value rows (groups) have a larger value of M.

In one example, the blocks selected from a row of FIG. 5 for a third block in a row, e.g., of FIG. 6, are selected in order of decreasing value of M starting with the largest value, where higher value rows (groups) have a smaller value of M, as shown in FIG. 6.

In another example, the blocks selected from a row of FIG. 5 for a third block in a row, e.g., of FIG. 6, are selected in order of increasing value of M starting with a value of M=1, where higher value rows (groups) have a larger value of M.

Various combinations of the pervious examples can be selected.

Figure 7:
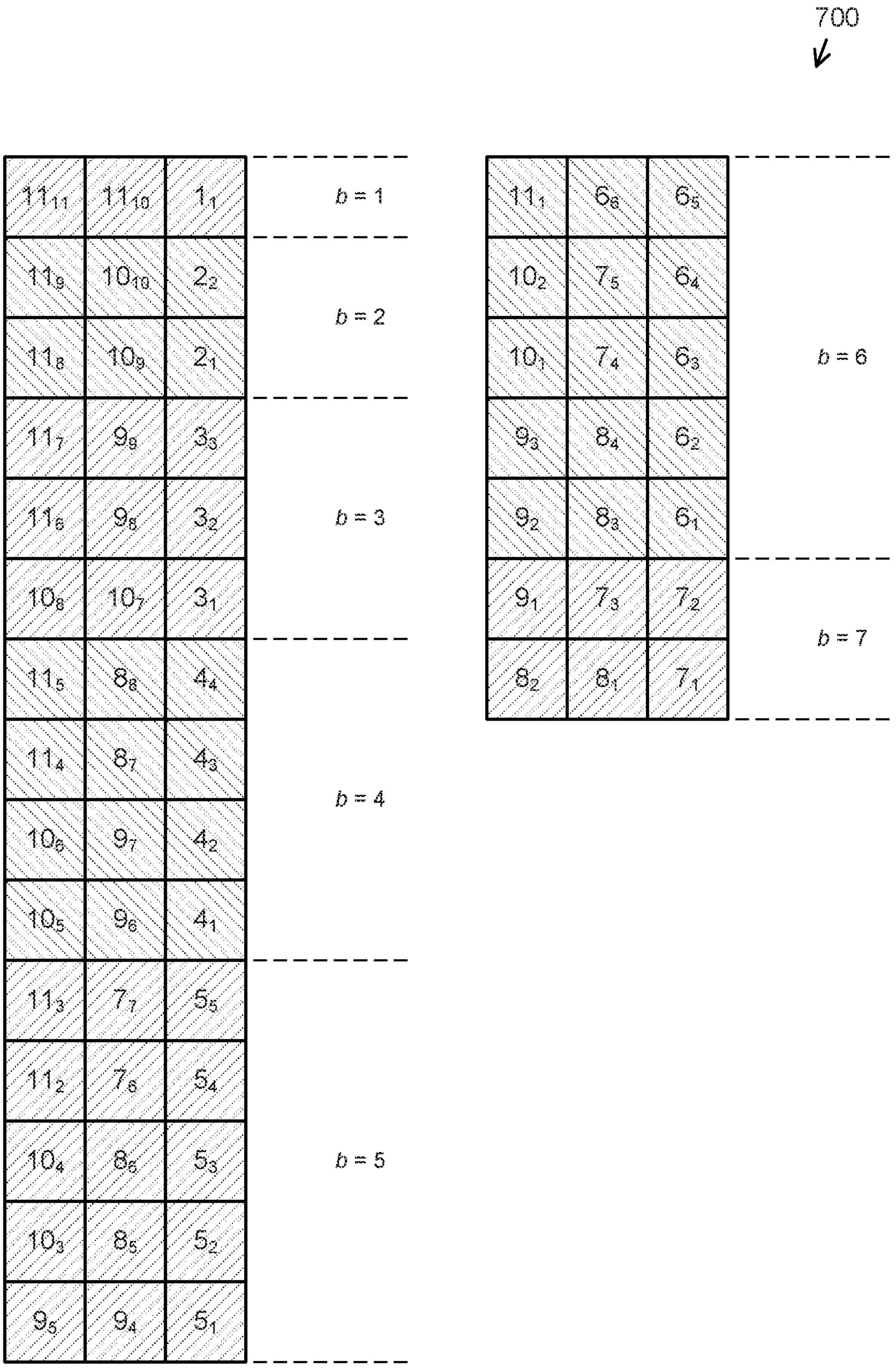
FIG. 7 illustrates an exemplary arrangement of codepoints in groups of another predetermined size (2S+1, where S=11 in the example shown)
Figure 8:
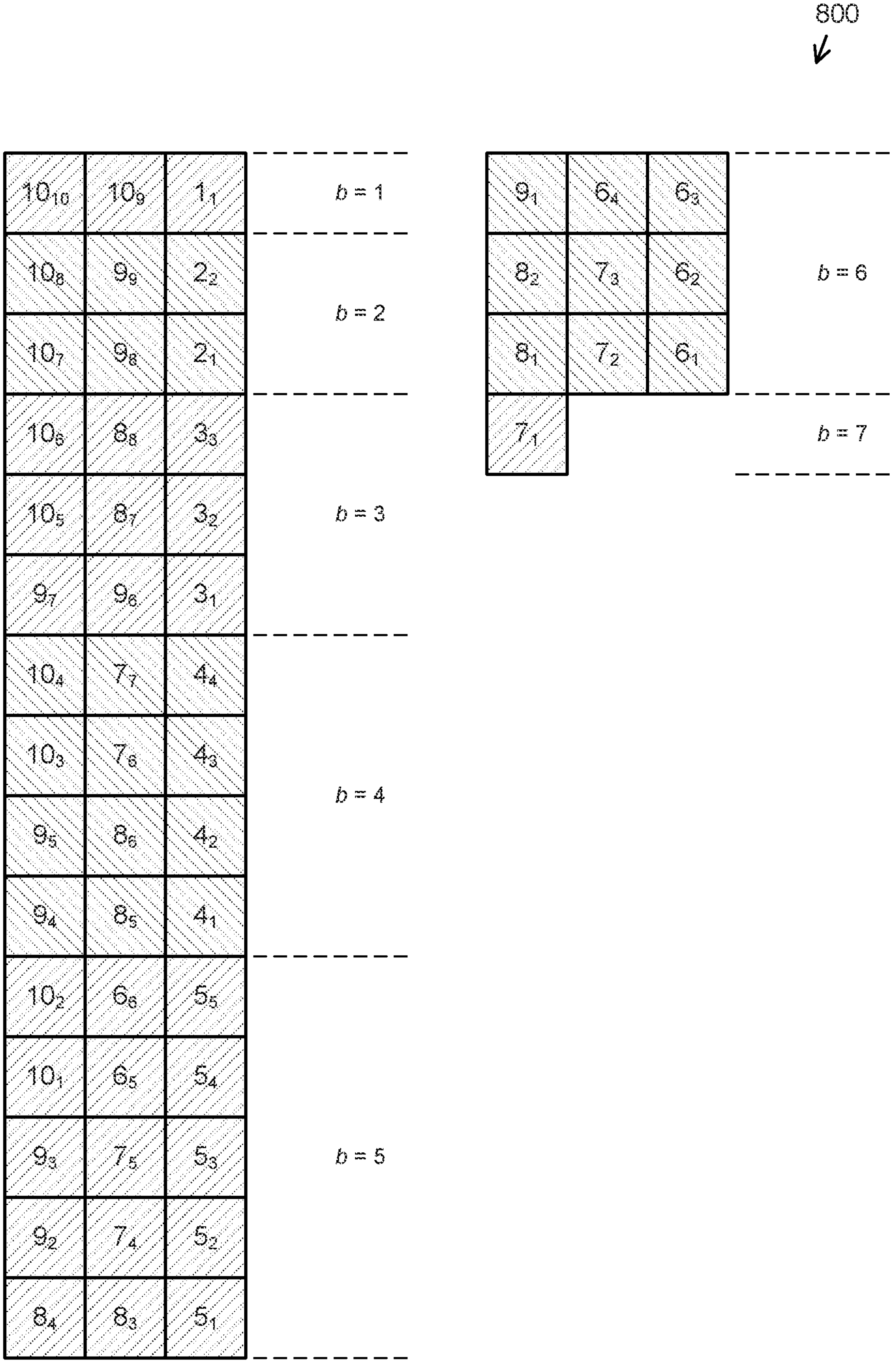
FIG. 8 illustrates an exemplary arrangement of codepoints in groups of still another predetermined size (2S+1, where S=10 in the example shown)

Further examples with S=11 and S=10 are show in FIG. 7 and FIG. 8, respectively. It should be noted that in some cases, for example when S=3N+1 (with N being an integer), the last row can be partially filled.

The index of each code-point is given by its location in the new arrangement (e.g., FIG. 6), where the index of the upper leftmost point is 1, and the index increments first in increasing order of column, then in increasing order of rows. Within each block, the code-points are arranged in increasing order of N.

The following procedure describes how to determine the value of code-point based on the values of K, M, and N, where K=S+1−L. S is the total number of sub-channels. Define

D = 2S + 1.

$$b = S - K + \left\lceil \frac{K+1-M}{2} \right\rceil$$

```
If (K ≤ b)&&(M ≤ D − 3 * K) // For last block of each row
        b = K
        col_id = D − K + N
        rowg_id = K − M // row id within a super-group
Else if K = (D − b)/2 // Last row (group) of an odd super-group
    If M = 3K − 2S // First block in group
        col_id = N
    Else // Second block in group
        col_id = K + N
    End if
        row g_id = b − 1
Else // All other rows (groups)
    If (K + 1 − M) > b // First block in group
        col_id = N
      rowg_id = 2D − 3K − 2b − M
    Else // Second block in group
      col_id = D − b − K + N
        rowg_id = K − M
    Endif
End
If b > S/2 // Row adjustment for super groups lager than S/2
        row g_id = row g_id − (4b − D)
    If row g_id = −1, then row g_id = 0
```

$$row_{id} = rowg_{id} + \frac{b(b-1)}{2} - \frac{(2b-S-2)(2b-S-1)}{2}$$

-continued

```
Else
```

$$row_{id} = rowg_{id} + \frac{b(b-1)}{2}$$

```
End if
    Code - point value = col_id + D × row_id
```

In one example, L is a number of sub-channel indices assigned within a set of sub-channels S, where K=S+1−L.

In one example, M is a sub-channel starting index of a second resource.

In another example, M is a sub-channel starting index of a second resource plus 1.

In one example, N is a sub-channel starting index of a third resource.

In another example, N is a sub-channel starting index of a third resource plus 1.

When a receiver gets code-point value r, the following steps can be followed to determine the L, M and N of the code-point, where L is the length of the number of sub-channels, with a corresponding K=S+1−L.

M is a starting sub-channel of a second resource.

In another example M is a starting sub-channel index of a second resource plus 1.

N is a starting sub-channel of a third resource.

In another example N is a starting sub-channel index of a third resource plus 1.

S is a total number of sub-channels.

1. Determine row (group) number g. This can be determined as follows.

$$g = \left\lfloor \frac{r-1}{2S+1} \right\rfloor$$

2. Determine the super group number b, and group number c within each group. Where c=0 . . . (b−1) for case (a) below, and c=0 . . . (b'−1) for case (b) below. The equation for b' has been provided previously. This can be determined as follows:

a. If $g < \frac{1}{2}\lfloor S/2 \rfloor(\lfloor S/2 \rfloor + 1)$:

b is found by taking the floor of the root of the following equation: g=b(b−1)/2.

$$c = g - \frac{b(b-1)}{2}$$

b. Else:

b is found by taking the floor of the root of the following equation:

$$g - \frac{1}{2}\left\lfloor \frac{S}{2} \right\rfloor\left(\left\lfloor \frac{S}{2} + 1 \right\rfloor\right) = \left(b - \left\lfloor \frac{S}{2} \right\rfloor - 1\right)\left(2S + 1 - 3\left\lfloor \frac{S}{2} \right\rfloor\right) - \frac{3\left(b - \left\lfloor \frac{S}{2} \right\rfloor\right)\left(b - \left\lfloor \frac{S}{2} \right\rfloor - 1\right)}{2}$$

$$c = g - \frac{1}{2}\left\lfloor\frac{S}{2}\right\rfloor\left(\left\lfloor\frac{S}{2}\right\rfloor + 1\right) - \left(b - \left\lfloor\frac{S}{2}\right\rfloor - 1\right)\left(2S + 1 - 3\left\lfloor\frac{S}{2}\right\rfloor\right) + \frac{3\left(b - \left\lfloor\frac{S}{2}\right\rfloor\right)\left(b - \left\lfloor\frac{S}{2}\right\rfloor - 1\right)}{2}$$

For the first and second blocks of a row (group), and if c=0, set c=−1. This adjustment is needed as super group b has only 1 row group with block selected from row $S-\lfloor b''/2 \rfloor$.

3. Within each row (group) determine $k_1$, $k_2$ and $k_3$ of each of the three blocks.

a.

$$\text{If } g < \frac{1}{2}\left\lfloor\frac{S}{2}\right\rfloor\left(\left\lfloor\frac{S}{2}\right\rfloor + 1\right)$$

b"=0 b. Else $$b'' = 4b - (2S + 1)$$

Determine $k_1$, $k_2$ and $k_3$ as follows:

$$k_1 = S - \left\lfloor\frac{c + b''}{2}\right\rfloor$$

$$k_2 = S - (b - 1) - \left\lfloor\frac{c + b''}{2}\right\rfloor$$

$k_3$=b

4. Determine K, L, M and N of the code-point $$f = \mathrm{mod}(r - 1, 2S + 1) + 1$$

where mod is the modulus function that determines the remainder.

a. If $f \le k_1 \rightarrow$ $$K = k_1$$

$$M = 2(2S + 1) - 3K - (c + b'') - 2b$$

$$n = f$$

b. Else if $f \le (k_1 + k_2) \rightarrow$ $$K = k_1$$

$$M = K - (c + b'')$$

If b is odd and for the last row (group) of this super group (i.e., c+b"=b−1), adjust the value of M by subtracting one. This is needed as, in this case, there are two blocks from the same row of FIG. 5 in a row (group) of FIG. 6.

c. Else $$K = k_3$$

$$M = b - (c + b'')$$

$$N = f - k_1 - k_2$$

The example procedure for decoding the code-point is for the order of mapping of M, N, and L as shown in the example of FIG. 6. A different mapping order would require a corresponding update to the equations to encode the code-points and to decode the code-points.

Resource Selection for Sidelink

In case of groupcast PSCCH/PSSCH transmission, a network can configure a UE one of two options for reporting of HARQ-ACK information by the UE:

HARQ-ACK reporting option (1): A UE can attempt to decode a transport block (TB) in a PSSCH reception if, for example, the UE detects an SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB.

HARQ-ACK reporting option (2): A UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ-ACK reporting option (1), when a UE that transmitted the PSSCH detects a NACK in a PSFCH reception, the UE can transmit another PSSCH with the TB (retransmission of the TB). In HARQ-ACK reporting option (2) when a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots which belong to a sidelink resource pool can be denoted by $$\{t_0^{SL}, t_1^{SL}, t_2^{SL}, \ldots\}$$

and can be configured, for example, at least using a bitmap. Within each slot $$t_y^{SL}$$

of a sidelink resource pool, there are $N_{subCH}$ contiguous sub-channels in the frequency domain for sidelink transmission, where $N_{subCH}$ is provided by a higher-layer parameter. Subchannel m is given by a set of $n_{subCHsize}$ PRBs, given by $$n_{PRB} = n_{subCHstart} + m \cdot n_{subCHsize} + j, \text{ where } j = 0, 1, \ldots, n_{subCHsize} - 1, n_{subCHstart} \text{ and } n_{subCHsize}$$

are provided by higher layer parameters. For resource (re-) selection or reevaluation in slot n, a UE can determine a set of available single-slot resources for transmission within a resource selection window $[n+T_1, n+T_2]$, such that a single-slot resource for transmission, $R_{x,y}$ is defined as a set of $L_{subCH}$ contiguous subchannels $$x + i, \text{ where } i = 0, 1, \ldots, L_{subCH} - 1 \text{ in slot } t_y^{SL}.$$

$T_1$ is determined by the UE such that, $$0 \le T\_1 \le T_{proc,1},$$

where $T_{proc,1}$ is a PSSCH processing time for example as defined in REF [4]. $T_2$ is determined by the UE such that $$T_{2min} \le T_2 \le \text{Remaining Packet Delay Budget},$$

as long as $T_{2min}$<Remaining Packet Delay Budget, else $T_2$ is equal to the Remaining Packet Delay Budget. $T_{2min}$ is a configured by higher layers and depends on the priority of the SL transmission.

The resource (re-)selection is a two-step procedure:

The first step is to identify the candidate resources within a resource selection window. Candidate resources are resources that belong to a resource pool, but exclude resources that were previously reserved, or potentially reserved by other UEs. The resources excluded are based on SCIs decoded in a sensing window and for which the UE measures an SL RSRP that exceeds a threshold. The threshold depends on the priority indicated in a SCI format and on the priority of the SL transmission. The resources excluded are based on reserved transmissions or semi-persistent transmissions that can collide with the excluded resources or any of reserved or semi-persistent transmissions.

The second step is to select or re-select a resource from the identified candidate resources.

During the first step of the resource (re-)selection procedure, a UE can monitor slots in a sensing window $$[n - T_0, n - T_{proc,0}],$$

where the UE monitors slots belonging to a corresponding sidelink resource pool that are not used for the UE's own transmission. To determine a candidate single-slot resource set to report to higher layers, a UE excludes from the set of available single-slot resources for SL transmission within a resource and within a resource selection window, the following:

---

1. Single slot resource $R_{x,y}$, such that for any slot $t_m^{SL}$ not monitored within the sensing window with a hypothetical received SCI Format 1-0, with a "Resource reservation period"
set to any periodicity value allowed by a higher layer parameter reseverationPeriodAllowed, and indicating all sub-channels of the resource pool in this slot, satisfies condition 2.2. below.

2. Single slot resource $R_{xy}$, such that for any received SCI within the sensing window 1. The associated L1-RSRP measurement is above a (pre-)configured SL-RSRP threshold, where the SL-RSRP threshold depends on the priority indicated in the received SCI and that of the SL transmission for which resources are being selected.

2. (Condition 2.2) The received $SCI$ in slot $t_m^{SL}$, or if "Resource reservation field" is present the received $SCI$ the same $SCI$ is assumed to be received in slot $t^{SL}_{m+q\times P'_{rsvp\_Rx}}$, indicates a set of resource blocks that overlaps $R_{x,y+j\times P'_{rsvp\_Tx}}$, where, q = 1,2,..., Q , where, If $P_{rsvp\_RX} \le T_{scal}$ and $n' - m < P'_{rsvp\_Rx} \rightarrow Q = \left\lceil \frac{T_{scal}}{P_{rsvp\_RX}} \right\rceil$ Else Q = 1

If $n$ belongs to $(t_0^{SL}, t_1^{SL}, \ldots, t_{T_{max}}^{SL})$, $n' = n$, else $n'$ is the first slot after slot $n$ belonging to set $(t_0^{SL}, t_1^{SL}, \ldots, t_{T_{max}}^{SL})$.

$j = 0,1,\ldots, C_{resel}-1$ $P_{rsvp\_Rx}$ is the indicated resource reservation period in the received SCI in physical slots, and $P'_{rsvp\_Rx}$ is that value converted to logical slots.

$P'_{rsvp\_Tx}$ is the resource reservation period of the $SL$ transmissions for which resources are being reserved in logical slots.

3. If the candidate resources are less than a predetermined percentage, such as 20%, of -continued

| |
|---|
| the total available resources within the resource selection window, the (pre-)configured SL-RSRP thresholds are increased by a predetermined amount, such as 3 decibels (dB). |

NR sidelink introduced two new procedures for mode 2 resource allocation; reevaluation and preemption.

Reevaluation check occurs when a UE checks the availability of pre-selected SL resources before the resources are first signaled in an SCI Format, and if needed re-selects new SL resources. For a pre-selected resource to be first-time signaled in slot m, the UE performs a reevaluation check at least in slot $m-T_3$. The reevaluation check includes:

Performing the first step of the SL resource selection procedure [38.214 section 8.1.4], which involves identifying a candidate (available) sidelink resource set in a resource selection window as previously described.

If the pre-selected resource is available in the candidate sidelink resource set, the resource is used/signaled for sidelink transmission.

Else, the pre-selected resource is not available in the candidate sidelink resource set, a new sidelink resource is re-selected from the candidate sidelink resource set.

Preemption check occurs when a UE checks the availability of pre-selected SL resources that have been previously signaled and reserved in an SCI Format, and if needed re-selects new SL resources. For a pre-selected and reserved resource to be signaled in slot m, the UE performs a preemption check at least in slot $m-T_3$. The preemption check includes:

Performing the first step of the SL resource selection procedure [38.214 section 8.1.4], which involves identifying candidate (available) sidelink resource set in a resource selection window as previously described.

If the pre-selected and reserved resource is available in the candidate sidelink resource set, the resource is used/signaled for sidelink transmission.

Else, the pre-selected and reserved resource is NOT available in the candidate sidelink resource set. The resource is excluded from the candidate resource set due to an SCI, associated with a priority value $P_{RX}$, having an RSRP exceeding a threshold. Let the priority value of the sidelink resource being checked for preemption be $P_{TX}$.

If the priority value $P_{RX}$ is less than a higher-layer configured threshold and the priority value $P_{RX}$ is less than the priority value $P_{TX}$. The pre-selected and reserved sidelink resource is preempted. A new sidelink resource is re-selected from the candidate sidelink resource set. Note that, a lower priority value indicates traffic of higher priority.

Else, the resource is used/signaled for sidelink transmission.

As described above, the monitoring procedure for resource (re)selection during the sensing window requires reception and decoding of a SCI format during the sensing window. This reception and decoding process increases a processing complexity and power consumption of a UE for sidelink communication and requires the UE to have receive circuitry for sensing even if the UE only transmits and does not receive on the sidelink.

3GPP Release 16 is the first NR release to include sidelink through work item "5G V2X with NR sidelink," the mechanisms introduced focused mainly on vehicle-to-everything (V2X), and can be used for public safety when the service requirement can be met. Release 17 extends sidelink support to more use cases through work item "NR Sidelink enhancement" (RP-193231). One of the motivations for the sidelink enhancement in Release 17, as mentioned in the work item description (WID), is power savings:

Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

One of the objectives of the Release 17 sidelink enhancement work item, as described in the WID, is to specify resource allocation enhancements that reduce power consumption, taking the release 14 LTE sidelink random resource selection and partial sensing as baseline with potential enhancements:

2. Resource Allocation Enhancement:

Specify resource allocation to reduce power consumption of the UEs [RAN1, RAN2]

Baseline is to introduce the principle of Rel-14 LTE sidelink random resource selection and partial sensing to Rel-16 NR sidelink resource allocation mode 2.

Note: Taking Rel-14 as the baseline does not preclude introducing a new solution to reduce power consumption for the cases where the baseline cannot work properly.

To alleviate the issues associated with sensing, a random resource selection has been considered in LTE for sidelink transmission. With a random resource selection, a UE randomly selects a resource for sidelink transmission within the total available resources of a resource pool within a resource selection window. However, with random resource selection, there is no control on which resource is selected by a UE within the total available resources and this absence of control can lead to a higher resource collision rate and increased failures on the sidelink interface. A resource is defined by a set of time resources, such as symbols of a slot or slots, and a set of frequency resources such as a number of RBs of sub-channels. A collision on a resource over the time-frequency domain occurs when two or more UE transmit on the resource.

In some scenarios, for example for vulnerable road users (VLU), a low-cost, low-complexity and low-power terminal is desirable. In one example, the terminal might be just transmitting its location and/or motion information to surrounding UEs, within a communication range, to alert other UEs of the presence of the VRU. For low-cost, low-complexity and low-power operation, these UEs might just transmit on the sidelink without receiving, and hence no sensing. To transmit on the sidelink, the UE does random resource selection within a candidate set of sidelink resources. To mitigate the collision probability with other UEs that are also doing random resource selection, a set of preferred candidate resources for random resource selection are determined by the UE. The preferred resources can be determined, for example, based on:

- A user identity
- A user's location
- A user's service class.
- Priority of sidelink data, wherein, for example, higher priority data is associated with sidelink resource which have a lower collision probability.

These methods can be applied whether or not a UE can receive on the sidelink.

This disclosure considers methods for random resource selection for sidelink transmissions that mitigate and reduce a probability of resource collisions among UEs. UEs are (pre-)configured preferred sidelink resources for random resource selection, where a UE can determine preferred resources based on a UE identity (ID), on a data priority level of a sidelink transmission, on a location of the UE, and/or on other UE characteristics.

The present disclosure relates to a 5G/NR communication system.

The present disclosure relates to methods for random resource selection for sidelink transmissions by a UE that reduce a probability of resource collisions among UEs. UEs are (pre-) configured preferred sidelink resources for random resource selection and a UE can determine preferred resources based on a UE identity, on a data priority level of a sidelink transmission, on a location of the UE, and/or on other UE characteristics.

Figure 9:
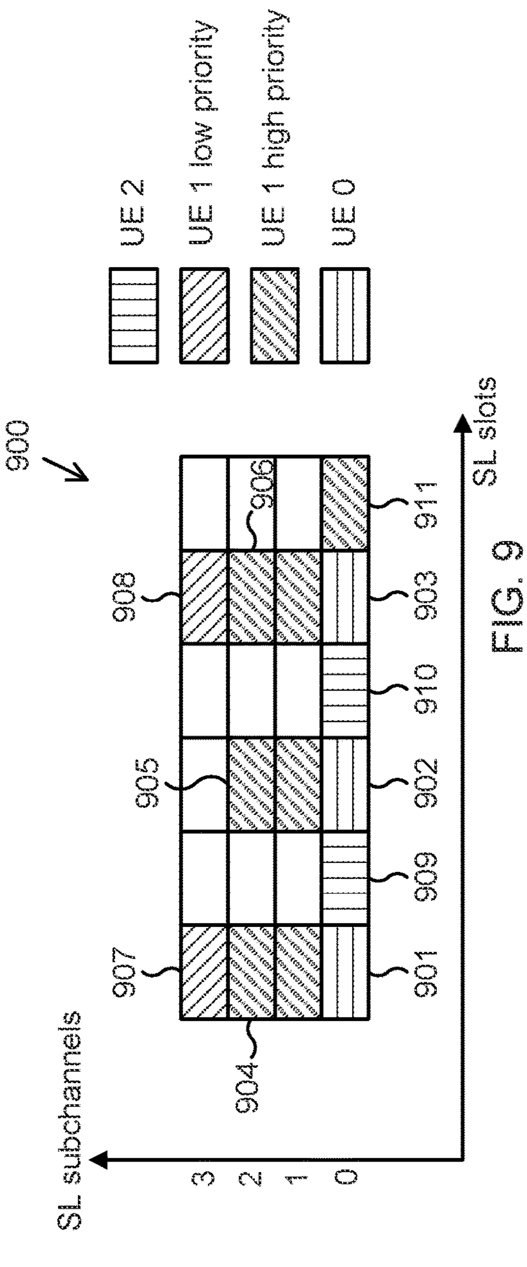
FIG. 9 illustrates an example of sidelink slots and sub-channels of a sidelink resource pool.

FIG. 9 provides an example of sidelink slots and sub-channels of a sidelink resource pool. In this example 900, a UE determines sidelink resources wherein the determined sidelink resources are preferred resources for random resource (re-)selection. In the example of FIG. 9:

- A first UE determines resources 901, 902 and 903 that are single sub-channel resources, such as for sub-channel 0, and have a periodicity of 2 slots.
- A second UE having high priority traffic determines resources 904, 905 and 906, that are double sub-channel resources, such as for sub-channels 1 and 2, and have a periodicity of 2 slots.
- A second UE, also having low priority traffic, determines resources 907 and 908 that are single sub-channel resources, such as for sub-channel 3, and have a periodicity of 4 slots.
- A third UE determines resources 909, 910 and 911 that are single sub-channel resources, such as sub-channel 0, and have a periodicity of 2 slots. In the example of FIG. 9, a transmission from the third UE is offset by one slot from a transmission from the first UE.

Component 1: (Pre-)Configured Sidelink Resources Based on a UE ID

In one example, the determined resources for sidelink random resource selection can be (pre-)configured resources that can be based on a UE ID.

In one example 1.1, a UE ID can be a source ID or can be based on the source ID.

In another example 1.2, a UE ID can be a physical layer, Layer 1 (L1), source ID, or can be based on a L1 source ID. For example, a L1 source ID can comprise of 8 bits while a L1 destination ID can comprise of 16 bits. In another example 1.3, a UE ID can be an RNTI, or can be based on an RNTI, used to scramble cyclic redundancy check (CRC) bits in a DCI format included in a PDCCH transmission from a gNB to the UE.

In one example 1.3.1, the RNTI can be a SL-RNTI used to scramble CRC bits of a DCI Format 3_0 for a dynamic grant.

In another example 1.3.2, the RNTI can be a SL-CS-RNTI used to scramble CRC bits for a DCI Format 3_0 for a type-2 configured grant.

In another example 1.3.3, the RNTI can be an RNTI allocated to a UE for NR Uu such as C-RNTI, CS-RNTI, SP-CSI-RNTI, or MCS-C-RNTI.

In another example 1.4, the UE ID can be the Temporary Mobile Subscriber Identity (TMSI), or can be based on the TMSI.

In another example 1.5, the UE ID can be the International Mobile Subscriber Identity (IMSI), or can be based on the IMSI.

In another example 1.6, the UE ID can be the International Mobile Equipment Identity (IMEI), or can be based on the IMEI.

Component 2: (Pre-)Configured Sidelink Resources Based on a Data Priority Level

In one example, the resources for sidelink random resource selection can be (pre-) configured resources based on SL data priority level.

In one example 2.1, a UE determines SL resources within a resource pool for sidelink random resource selection based on priority of SL resources, where resources are (pre-) configured for each priority level.

In one example 2.1.1, a UE determines SL resources within a resource pool for sidelink random resource selection within (pre-)configured resources for a data priority level based on a UE ID.

In another example 2.1.2, a UE determines SL resources within a resource pool for sidelink random resource selection within (pre-)configured resources for a data priority level independent of a UE ID.

Figure 14:
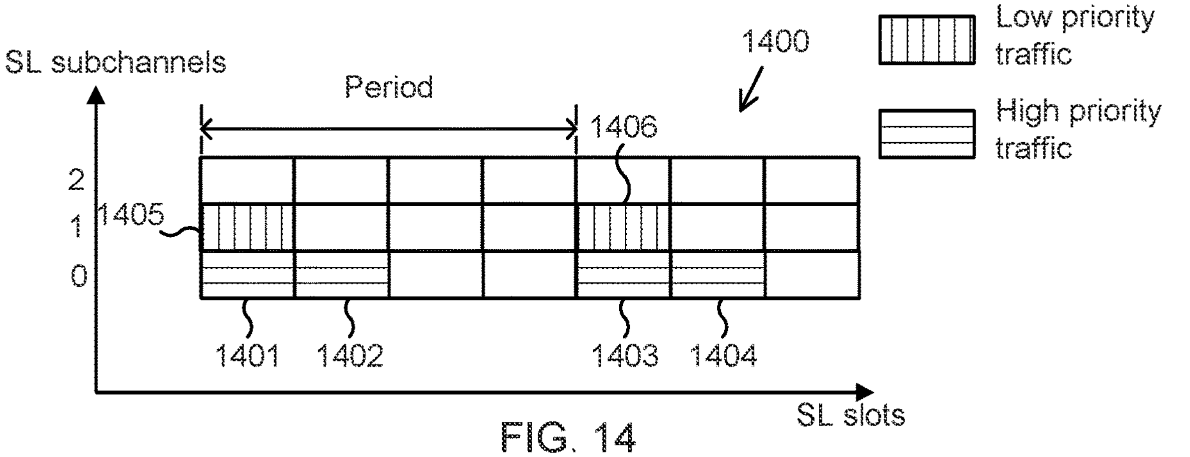

In one example 2.1.3, resources for different data priority levels are distinct, non-overlapping, resources in the time/frequency domain. An example is illustrated in FIG. 14.

Figure 15:
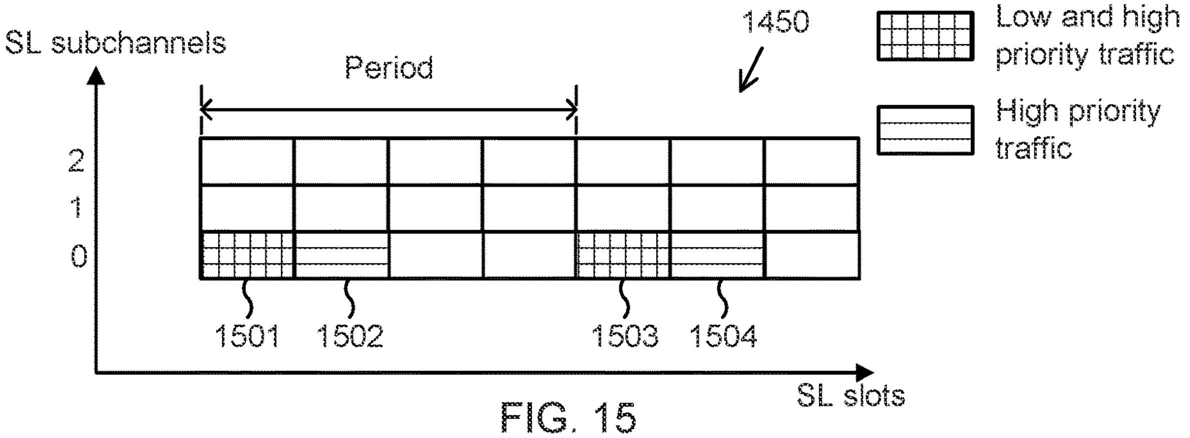

In another example 2.1.4, resources for different data priority levels can overlap in the time/frequency domain. Examples are illustrated in FIG. 14 and FIG. 15.

In another example 2.2, an SL resource pool is configured with a data priority level. A UE selects an SL resource pool based on the SL data priority level.

In one example 2.2.1, a UE determines SL resources within an SL resource pool associated with a data priority level based on a UE ID.

In another example 2.2.2, a UE determines SL resources within an SL resource pool associated with a data priority level independent of a UE ID.

In one example 2.2.3, SL resource pools associated with different data priority levels have distinct, non-overlapping, resources.

In another example 2.2.4, SL resource pools associated with different data priority levels have overlapping resources.

Component 3: (Pre-)Configured Sidelink Resources Based on a UE Service Class

In one example, the determined resources for sidelink random resource selection can be (pre-)configured resources based on a UE service class.

In one example 3.1, a UE service class can be (pre-) configured.

In another example 3.2, a UE service class can be determined from (based on) a UE ID.

In one example 3.2.1, a mapping between a UE service class and a UE ID can be pre-configured.

In one example 3.3, a UE determines SL resources within a resource pool for sidelink random resource selection based on UE service class, wherein resources are (pre-)configured for each UE service class.

In one example 3.3.1, resources for different UE service classes are distinct, non-overlapping, resources. in the time/frequency domain.

In another example 3.3.2, resources for different UE service classes can overlap in the time/frequency domain.

In one example 3.3.3, a UE determines SL resources within a resource pool for sidelink random resource selection within (pre-)configured resources for a UE service class based on SL data priority, wherein SL resources are (pre-) configured for each data priority level within resources of a UE service class.

In one example 3.3.4, resources for different UE service classes and UE SL data priority levels are distinct, non-overlapping, resources in the time/frequency domain.

In another example 3.3.5, resources for different UE service classes and/or UE SL data priority levels can overlap in the time/frequency domain.

In another example 3.4, an SL resource pool is configured for UE service class. A UE selects an SL resource pool for sidelink random resource selection based on the UE's service class.

In one example 3.4.1, SL resource pools associated with different UE service classes have distinct, non-overlapping, resources in the time/frequency domain.

In another example 3.4.2, SL resource pools associated with different UE service classes can have overlapping resources in the time/frequency domain.

In one example 3.4.3, a UE determines SL resources within an SL resource pool associated with a UE service class based on an SL data priority level wherein, SL resources can be (pre-)configured for each data priority level within a resource pool of a UE service class SL resource pools can be (pre-)configured for each data priority level within a resource pool of a UE service class. For example, an SL resource pool for a data priority and a UE service class is a sub-resource pool of the resource pool for the UE service class.

SL resource pool for a UE service class and SL data priority level is a sub-resource pool of a resource pool for the SL data priority level. SL data priority level resource pools and UE service class sub-resource pools are pre-configured.

In one example 3.4.4, resources/resource pools for different UE service classes and UE SL data priority levels are distinct, non-overlapping, resources.

In another example 3.4.5, resources/resource pools for different UE service classes and/or UE SL data priority levels can overlap in the time-frequency domain.

Component 4: (Pre-)Configured Sidelink Resources Based on a UE Location

In one example, the determined resources for sidelink random resource selection can be (pre-)configured resources based on UE location, where UE location can be based on territory ID or a zone ID.

Figure 10:
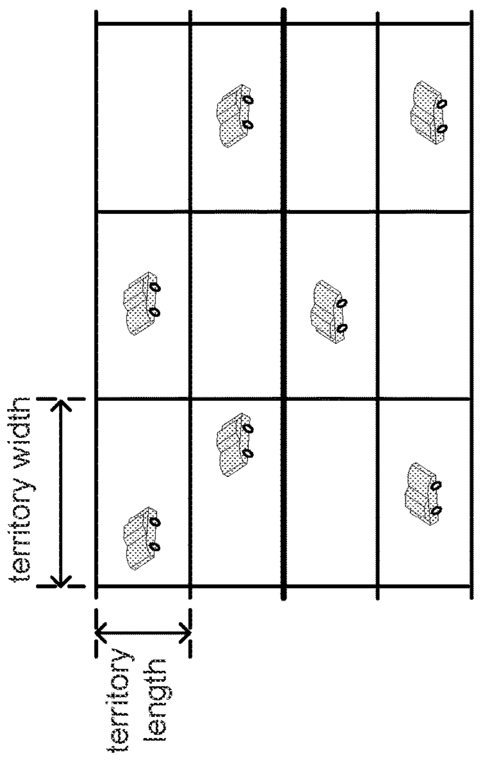

In one example 4.1, a territory can be considered as an area around a UE where only one UE is expected to be present. For example, in FIG. 10, UEs are traveling along an east-west highway with a lane width of 4 meters, inter-vehicular separation of 2 seconds, and average vehicle length of 5 meters. If UEs/vehicles are traveling at a speed of 30 meters per second (m/sec), or approximately 67 miles per hour (mph), the distance between the front of a vehicle and the front of a next vehicle is 30*2+5=65 meters. Each rectangle of size 65 m×4 m is considered as one area or one territory, where only one vehicle (UE) is expected to be found. In this example;

Width of territory=w=average vehicle speed×average time between two vehicles+average vehicle length Length of territory=l=width of lane.

Assuming, for example, that a number of unique territory IDs in the east-west direction is $N_w$ and a number of unique territory IDs in the north-south direction is $N_l$, a territory ID $n_w$ in the east-west direction can be determined as $n_w$=(longitude distance in meters/w)mod $N_w$, where longitude is positive if east of the Prime Meridian and negative if west of the Prime Meridian. Other methods for determining $n_w$ can be based on calculating the longitude distance (i.e., east-west distance) relative to a reference point.

The territory ID $n_l$ in the north-south direction can be determined as $n_l$=(latitude distance in meters/l)mod Ni, where latitude is positive if north of the Equator, and negative if south of the Equator. Other methods for determining $n_l$ can be based on calculating the latitude distance (i.e., north-south distance) relative to a reference point.

Figure 11:
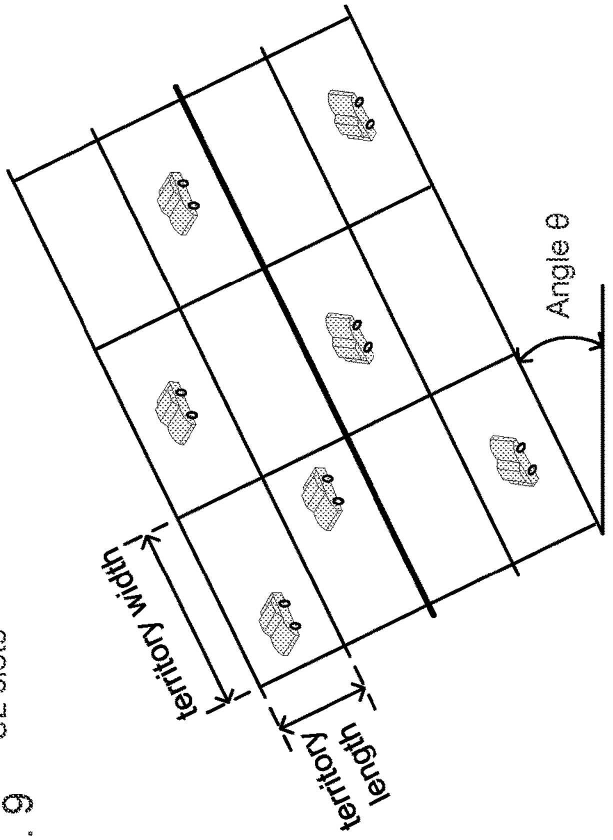
FIGS. 10 and 11 depict UEs traveling along a highway with a lane width, inter-vehicular separation, and average vehicle length.

As another example illustrated in FIG. 11, a direction of travel, such as a direction of road, has an angle θ to the east-west direction. In this example, the width and length of a territory have angle θ to the east-west and north-south directions, respectively.

The distance $d_w$ along the width of the territory can be determined as $d_w$=(longitude distance in meters)×cos θ+(latitude distance in meters)×sin θ. The distance $d_w$ can alternatively be determined relative a reference point. Similar, the distance $d_l$ along the length of the territory can be determined as $d_l$=(latitude distance in meters)×cos θ+(longitude distance in meters)×sin θ. Alternatively, $d_l$ can be calculated relative a reference point.

The territory ID along the width direction $n_w$ can be determined as $n_w=(d_w/w) \bmod N_w$.

The territory ID along the length direction $n_l$ can be determined as $n_l=(d_l/l) \bmod N_l$.

In the above examples the territory ID can be found by combining $n_w$ and $n_l$ into a single ID $n_{T\_ID}$. For example, $$n_{T\_ID} = n_w + n_l \times N_w.$$

Alternatively, $$n_{T\_ID} = n_l + n_w \times N_l.$$

In one example 4.1.1, one or more of $N_w$, $N_l$, w, l, and θ are (pre-)configured. The (pre-)configured values can depend (i.e., are determined based on a rule as a function of) on a characteristic of motion of the UE, such as the UE's location and/or speed and/or direction of motion.

In another example 4.1.2, one or more of $N_w$, $N_l$, w, l, and θ can be pre-configured to a UE and may be further updated by a network for an in coverage UE. For example, the update can be through an RRC-configuration and/or MAC-CE signaling and/or L1 control such as by a DCI format in a PDCCH reception.

In another example 4.1.3, one or more of $N_w$, $N_l$, w, l, and θ can be semi-statically and/or dynamically updated by another UE. For example, the update can be through RRC-configuration, and/or MAC-CE signaling, and/or L1 control.

In one example 4.1.4, multiple UEs are located within one territory. The multiple UEs can be moving together in a same direction at a same or similar speed. For example, the multiple UEs can be different passengers and/or operator in a same vehicle. Each UE within the multiple UEs is allocated a unique ID. The sidelink resources for random resource selection can be further divided among the multiple UEs based on the allocated UE ID. Some UEs might be allocated to a same resource, other UEs might be allocated to a unique resource.

In one example 4.1.5, a UE determines SL resources based on a territory ID. The SL resources are further sub-divided based on a data priority-level and/or based on UE service class as described in components 2 and 3 respectively.

Figure 12:
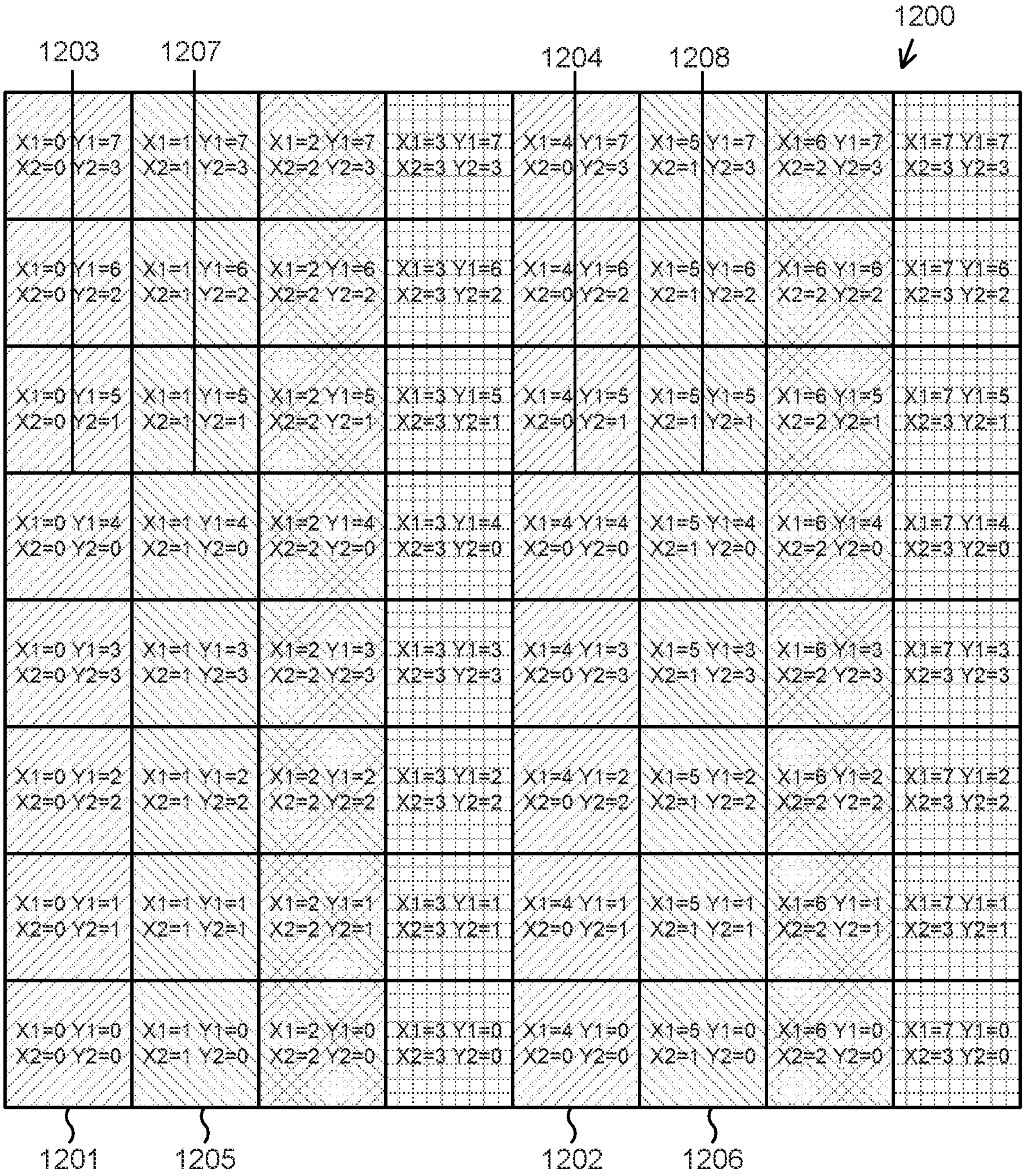
FIG. 12 depicts zones determined by two zone IDs.

In another example 4.2, a zone ID can include multiple UEs. Zone IDs within close proximity can be allocated unique resources for sidelink random resource selection. As illustrated in FIG. 12, a zone can be determined by two IDs X1 and Y1, wherein X1 can indicate a zone ID in the horizontal (x-axis) direction and Y1 can indicate a zone ID in the vertical (y-axis) direction. A zone ID $Zone_{id}$ can be determined as $Zone_{id}=Y1*N_x+X1$, where $N_x$ is a number of unique zone IDs in the x-axis direction. $N_y$ is a number of unique zone IDs in the y-axis direction.

A second zone ID in the x-axis direction can be determined as $X2=X1 \bmod N_{x2}$.

A second zone ID in the y-axis direction can be determined as $Y2=Y1 \bmod N_{y2}$.

A second zone $Zone_{id2}$ can be determined as $Zone_{id2}=Y2*N_{x2}+Y1$.

The determined resources for sidelink random resource selection can be based on $Zone_{id2}$, wherein the sidelink resources are divided into $N_{x2} \times N_{y2}$ sets of resources and, based on $Zone_{id2}$, a set of resources is selected through a random resource selection.

In the example illustrated in FIG. 12, $N_{x2}=4$ and $N_{y2}=4$. There are total of 16 unique $Zone_{id2}$ values and therefore the sidelink resources can be divided into 16 sets, where a set of sidelink resources is associated with a $Zone_{id2}$ value. In the example of FIG. 12:

- Zone 1201, 1202, 1203 and 1204, have X2=0, Y2=0, and $Zone_{id2}=0$, and therefore use a same set of sidelink resources for random resource selection.
- Zone 1205, 1206, 1207 and 1208, have X2=1, Y2=0 and $Zone_{id2}=1$, and therefore use a same set of sidelink resources for random resource selection.

In one example 4.2.1, the $N_{x2} \times N_{y2}$ sets of resources are non-overlapping in the time-frequency domain.

In another example 4.2.2, the $N_{x2} \times N_{y2}$ sets of resources are partially overlapping in the time-frequency domain.

In one example 4.2.3, within a set of resources based on a $Zone_{id2}$, the resources are further sub-divided based on a UE ID as described in component 1, and/or based on data priority level as described in component 2, and/or based on UE service class as described in component 3.

In one example 4.2.4, a resource set is associated with a $Zone_{id2}$, wherein, the resource sets can be non-overlapping or partially overlapping in the time-frequency domain.

Component 5: Time Domain Resources

In one example, a preferred slot offset within the slots of a resource pool for sidelink within a period can be determined based on a UE ID, and/or a data priority level, and/or a UE service class, and/or a UE location as described in components 1, 2, 3 and 4 respectively.

In one example 5.1, a slot offset within a period is determined as f(ID) mod period, where,

- f(ID) is a function of a UE ID and/or UE location ID, such as f(ID)=ID, or f(ID) depends on other parameters such as an SL data priority, a UE service class, a number of sub-channels, and so on.
- Period is a periodicity of preferred slots for random resource selection where the periodicity is in slots or in a unit of time such as milliseconds. In the example of FIG. 9, UE 1, high-priority traffic for UE 2, and UE 3 have a periodicity of 2 slots, while a low-priority traffic for UE 2 has periodicity of 4 slots.

In one example 5.1.1, the slot offset is in logical slots. Logical slots are slots that are in a sidelink resource pool, which are denoted by $$\{\ \{t_0^{SL}, t_1^{SL}, t_2^{SL}, \ldots\ \}.$$

In another example 5.1.2, the slot offset is in physical slots. Physical slots are slots over the air interface, which can include downlink, uplink and sidelink slots.

In another example 5.1.3, the slot offset is in a unit of time such as milliseconds.

In one example 5.1.4, the periodicity is in logical slots.

In another example 5.1.5, the periodicity is in physical slots.

In another example 5.1.6, the periodicity is in a unit of time such as milliseconds.

In one example 5.2, all UEs have a same period or periods.

In one example 5.2.1, the period is same for all SL data priorities.

In another example 5.2.2, the period depends on the SL data priority.

In other example 5.2.3, the period depends on a characteristic of motion of a UE, such as UE's location and/or speed and/or direction of motion.

In another example 5.3, UEs can have different periods.

In one example 5.3.1, a UE's period is based on higher layer configuration.

In another example 5.3.2, a UE's period is derived from a UE's ID.

In another example 5.3.3, the period is determined based on a UE service class.

In another example 5.3.4, a UE determines more than one periods for sidelink resources, where each period depends at least on an SL data priority and/or a characteristic of motion of the UE, such as UE's location and/or speed and/or direction of motion. In the example of FIG. 9, UE 2 has two periods. A period of 2 slots for high priority traffic and a period of 4 slots for low priority traffic.

Figure 13:
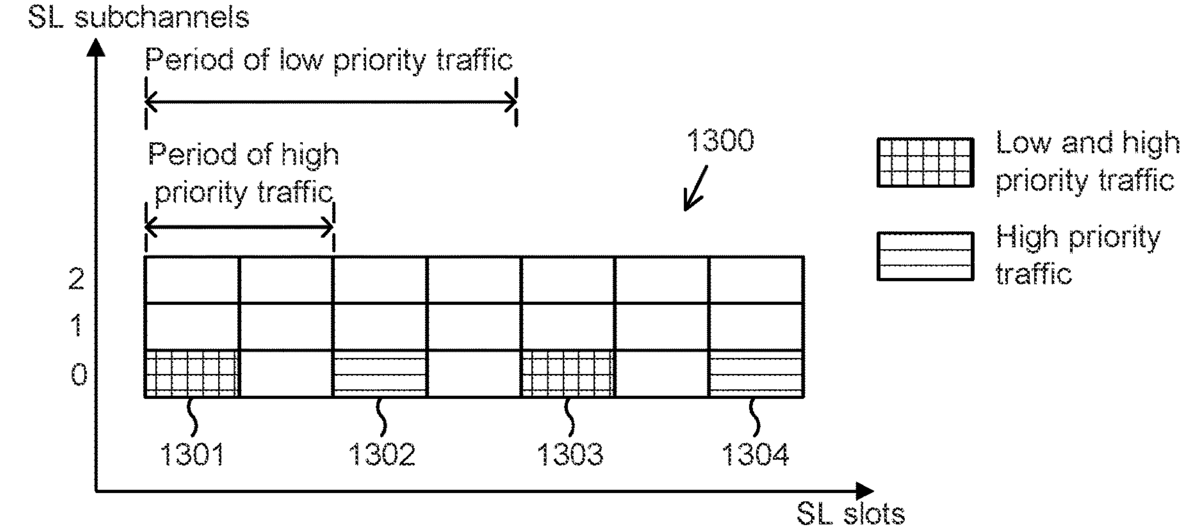
FIGS. 13 through 15 illustrate periods for sidelink resources allocated based on traffic priority.

In another example 5.3.5, and further to example 5.3.3, a UE determines more than one periods for sidelink resources, where each period depends at least on the SL data priority and/or a characteristic of motion of the UE, such as the UE's location and/or speed and/or direction of motion, with some of the resources of high and low priority traffic, or characteristic of motion of the UE, overlapping and some resources not overlapping in the time-frequency domain. As illustrated in FIG. 13, by way of example, high priority traffic has a period of 2 slots while low priority traffic has a period of 4 slots, and in one of the periods of high priority traffic the resources for high priority and low priority traffic overlap in the time-frequency domain. For example, in FIG. 13 (example 1300), occasions 1301, 1303 can be used for high or low priority traffic, while occasions 1302, 1304 is used only for high priority traffic.

In another example 5.3.6, a UE determines a period or multiple periods based on more than one of the methods in example 5.3.1 to example 5.3.5.

In one example 5.4, a UE has a single slot offset within each period determined by the UE, where a slot offset can be determined based on a UE ID, and/or a UE service class, and/or an SL data priority, and/or UE location, and/or a period length, and/or a higher layer configuration, and/or a MAC CE configuration value, and/or a physical layer (layer one) control signaling.

In another example 5.5, a UE has multiple slot offsets preferred for sidelink random resource selection within a period.

In one example 5.5.1, the number of slot offsets within a period is determined based on higher layer configuration.

In another example 5.5.2, the number of slot offsets within a period is determined based the UE's ID.

In another example 5.5.3, the number of slot offsets within a period is determined based on the UE service class.

In another example 5.5.4, the number of slot offsets within a period is determined based on the SL data priority and/or a characteristic of motion of the UE, such as UE's location, and/or speed, and/or direction of motion. As illustrated by example 1400 in FIG. 14, a UE has a period of 4 slots for random resource selection, wherein high priority traffic has two occasions within each period for random resource selection while low priority traffic has one occasion within each period for random resource selection. In FIG. 14, by way of example, within a period, high priority traffic has two occasions 1401 and 1402 corresponding to two slots offsets, while low priority traffic has one occasion 1405 corresponding to one slot offset. In the next period high priority traffic has two occasions 1403 and 1404, while low priority traffic has one occasion 1406.

In another example 5.5.5, and further to example 5.5.4, some occasions are common for low priority and high priority traffic and/or a characteristic of motion of the UE. As illustrated in FIG. 15, by way of example (1500), within a period, occasion 1501 can be used for high or low priority traffic, while occasion 1502 is used only for high priority traffic. In the next period, occasion 1503 is used for high or low priority traffic, while occasion 1504 is used only for low priority traffic.

In another example 5.5.6, a UE determines a period or multiple periods based on more than one of the methods in example 5.5.1 to example 5.5.5.

In one example, preferred frequency resource(s) within the sub-channels of a resource pool for sidelink can be determined based on a UE ID, and/or a data priority level, and/or a UE service class, and/or a UE location. Frequency resource(s) within a slot are determined by a start sub-channel and a number of consecutive sub-channels starting from the start sub-channel.

In one example 6.1, a start sub-channel is determined based on a UE ID, and/or UE service class, and/or UE location, and/or higher layer configuration, and/or MAC CE configuration, and/or physical layer (layer one) control signaling.

In one example 6.1.1, the start sub-channel is same for all SL data priority levels.

In another example 6.1.2, the start sub-channel depends on an SL data priority level.

In one example 6.1.3, the start sub-channel is same for all slot offsets within a period where a slot can be a physical slot or a logical slot.

In another example 6.1.4, the start sub-channel depends on a slot offset within a period where a slot can be a physical slot or a logical slot.

In another example 6.1.5, the start sub-channel depends on a slot number where a slot can be a physical slot or a logical slot.

In one example 6.2, a number of sub-channels is determined based on a UE ID, and/or UE service class, and/or UE location, and/or higher layer configuration, and/or MAC CE configuration, and/or physical layer (layer one) control signaling.

In one example 6.2.1, the number of sub-channels is the same for all SL data priority levels.

In another example 6.2.2, the number of sub-channels depends on an SL data priority level and/or a characteristic of motion of the UE, such as the UE's location, and/or speed, and/or direction of motion.

In one example 6.3, preferred time resource(s) and frequency resource(s) within time slots of a resource pool for sidelink and sub-channels of a resource pool for sidelink can be determined jointly based on a UE ID, and/or a data priority level, and/or a UE service class, and/or UE location, and/or higher layer configuration, and/or MAC CE configuration, and/or physical layer (layer one) control signaling.

Figure 16:
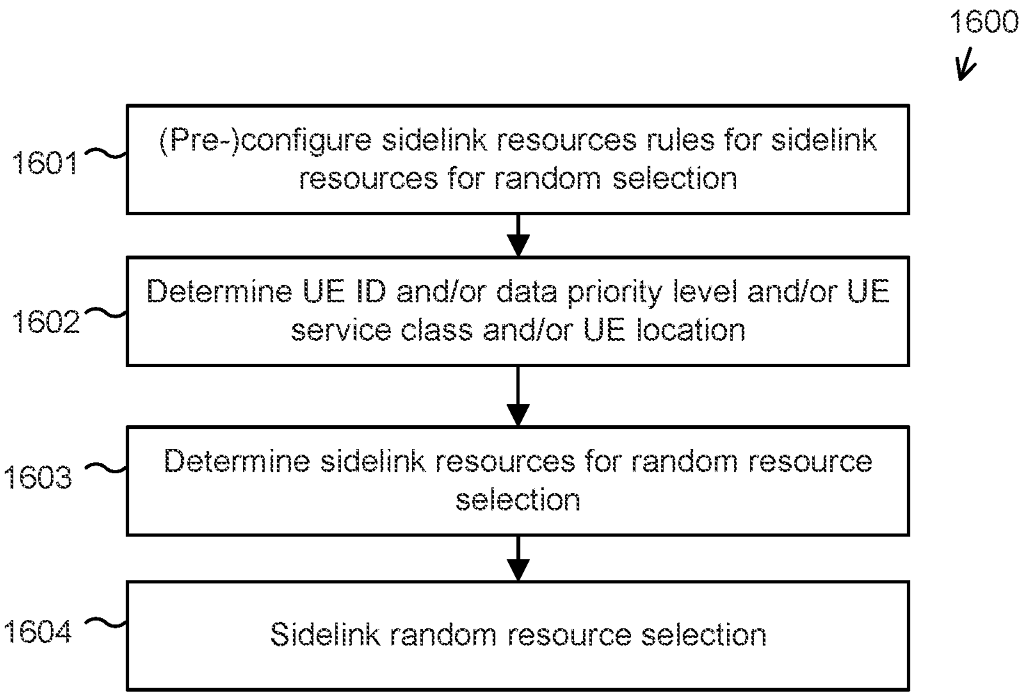
FIG. 16 is a high level flowchart illustrating an example procedure for sidelink random resource selection based on the examples presented in this disclosure.

FIG. 16 illustrates an example procedure for sidelink random resource selection based on the examples presented in this disclosure.

In step 1601, sidelink resources (e.g., sidelink resource pool(s)) are (pre-)configured, along with the rules for determining sidelink resources for random resource selection.

In step 1602, a UE determines the characteristics for determining sidelink resources for random resource selection, such as UE ID, sidelink data priority level, UE service class, UE location and/or some other characteristic of motion such as UE speed and/or direction of motion.

In step 1603, a UE determines candidate sidelink resources for random resource selection.

In step 1604, a UE performs random resources selection with the determined resources in step 1603.

As used herein, "randomly selecting" a plurality of sidelink resources encompasses:

- random selection of every sidelink resource within the selected plurality, randomly selected resources are arranged in order of time, with the earliest randomly selected resource being the first-in-time,
- random selection of only the first-in-time of the selected plurality of sidelink resources, with the remainder of the selected plurality of sidelink resources selected based on some rule or relationship with the selected first-in-time sidelink resource,
- random selection in time of every sidelink resource within the selected plurality, randomly selected resources are arranged in order of time, with the earliest randomly selected resource being the first-in-time, with selection (e.g., randomly) in frequency of the first-in-time randomly selected resource and with the remainder of the selected plurality of sidelink resources selected based on some rule or relationship, in frequency, with the selected first-in-time sidelink resource, or
- random selection of only the first-in-time resource of the selected plurality of sidelink resources, with the remainder of the selected plurality of sidelink resources selected based on a combination of random selection (e.g., in frequency) and some rule or relationship with the selected first-in-time sidelink resource (e.g., in time).

Method and Apparatus for SL Random Resource Selection with Reevaluation and Preemption In embodiments disclosed above, a method is suggested to alleviate collision by restricting the resources a user can select for transmission based on a characteristic such as a user identity, a user location or a data priority. Alternatively, partial sensing can reduce the computation complexity by reducing the number of sensed slots during a sensing window, however, there is a tradeoff between sensing accuracy and computation complexity. With more slots sensed during a sensing window, the sensing accuracy is improved, and hence less likelihood of collision on a selected single slot resource within a resource selection window, however, the computation complexity is higher and hence higher power consumption by the UE. On the other hand, with less slots sensed during a sensing window, the computation complexity is reduced, and hence less power consumption at the expense of a deterioration of the sensing accuracy and hence a greater likelihood of collision on a selected single slot resource within a resource selection window.

As described earlier, in release 16 NR Sidelink, two new procedures have been introduced to improve quality of service and minimize collision rate for aperiodic traffic, these include reevaluation check and preemption check. In this disclosure, we consider introducing reevaluation check and preemption check for random resource selection. When a random resource selection procedure is triggered, resources are selected randomly within a resource selection window without sensing. Before the first-in-time resource is transmitted, a reevaluation check occurs based on sensing within a sensing window, wherein, the sensing window starts no earlier than the trigger of the random selection procedure, and within a determined time from the first-in-time resource for SL transmission. When a previously signaled/reserved resource selected by a random resource selection procedure is to be signaled on a sidelink resource, a preemption check occurs based on sensing within a sensing window, wherein, the sensing window starts no earlier than the trigger of the random selection procedure, and within a determined time from the current resource for SL transmission.

By performing reevaluation check and preemption check for random resource selection, the probability of collision is reduced. As the sensing window size is shortened, and sensing is tied to signaling/transmission on an SL resource, the UE complexity is reduced and power savings can be achieved.

3GPP Release 16 is the first NR release to include sidelink through work item "5G V2X with NR sidelink," the mechanisms introduced focused mainly on vehicle-to-everything (V2X), and can be used for public safety when the service requirement can be met. Release 17 extends sidelink support to more use cases through work item "NR Sidelink enhancement" (RP-201385). One of the motivations for the sidelink enhancement in Release 17, as mentioned in the work item description (WID) (REF [8]), is power savings. One of the objectives of the Release 17 sidelink enhancement work item, as described in the WID (REF [8]), is to introduce the principle of Rel-14 LTE sidelink random resource selection. In NR release 16, reevaluation check and preemption check have been introduced to improve the handling of aperiodic traffic. In this disclosure, we consider aspects related reevaluation check and preemption check for random resource selection.

This disclosure introduces methods related to reevaluation check and preemption check to random resource selection.

Figure 17:
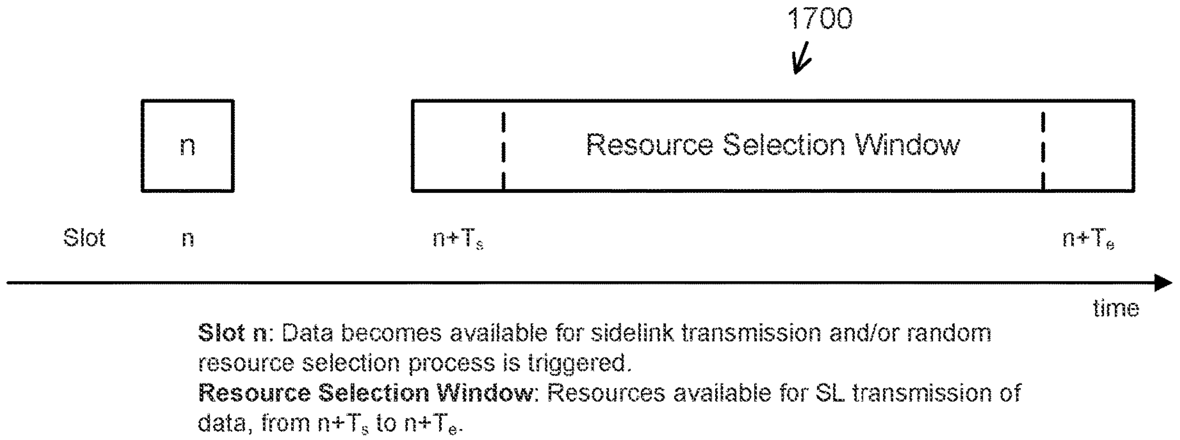
FIGS. 17 and 18 illustrate timing of resource selection relative to a resource selection window based on the examples presented in this disclosure.

In this disclosure a UE capable of sidelink transmission is triggered or becomes aware that the UE needs to transmit a packet on the sidelink in slot n, alternatively, a random selection procedure can be executed in slot n, as illustrated in FIG. 17. The UE randomly selects one or more resources for sidelink transmission within a sidelink resource selection window determined by the time interval [n+$T_s$, n+$T_e$], the resources are selected without sensing, wherein $T_s$ is the start of the resource selection window with respect to slot n, and $T_e$ is the end of the resource selection window respect to slot n. $T_s$ and can $T_e$ can be specified by system specifications and/or configured/updated by higher layer RRC signaling and/or MAC CE signaling and/or L1 control signaling. $T_s$ can be determined by UE implementation or UE capability not to exceed a value specified by system specifications and/or configured/updated by higher layer RRC signaling and/or MAC CE signaling and/or L1 control signaling. $T_e$ can be determined such that n+$T_s$ does not exceed the packet delay budget and a value specified by system specifications and/or configured/updated by higher layer RRC signaling and/or MAC CE signaling and/or L1 control signaling, this value can depend on the quality of service of the sidelink traffic.

The set $S_A$ is defined to include all the candidate single-slot resources $R_{x,y}$ available for sidelink transmission within a sidelink resource pool within the resource selection window. Wherein, a single-slot resource $R_{x,y}$ is a set of $L_{subCH}$ contiguous sub-channels $$\{x+0, x+1, \ldots, x+L_{subCH}-1\} \text{ in slot } t_y^{SL}$$

in the corresponding resource pool [TS 38.214].

The random selection of single-slot resources for sidelink transmissions within the resource selection window is subject to time restrictions. For example, each two directly consecutive (in time) selected random resources should meet a minimum timing requirement $T_{min}$. For example, when HARQ-ACK feedback is enabled, this time is long enough to ensure that Rx sidelink UE can process the SL reception and generate the PSFCH feedback and that the Tx sidelink UE can receive and decode the PSFCH feedback and prepare a sidelink retransmission in the corresponding resource if needed, or possibly use the resource for a new sidelink transmission. Another time restriction is that SL resource signaled/reserved in Sidelink Control Information (SCI), should not exceed a maximum timing requirement $T_{max}$. For example, when two single-slot resources are signaled/reserved in an SCI, the duration (number of slots) between the time (slot) of the resource of the current transmission and the time (slot) of the resource of the next (re-) transmission (if any) is less than or equal to the maximum time (slot number) difference between resources that can be signaled in the sidelink control information (SCI) using the "time resource assignment" field. In release 16, this value corresponds to 31 slots. In another example, when three single-slot resources are signaled/reserved in an SCI, the duration (number of slots) between the time (slot) of the resource of the current transmission and the time (slot) of the resource of the second-next (re-)transmission (if any) is less than or equal to the maximum time (slot number) difference between resources that can be signaled in the SCI using the "time resource assignment" field. This can of course be extended to the third-next resource for (re-)transmission and so on, if more than 3 resources can be signaled in the SCI.

The slots can be numbered (indexed) as physical slots or logical slots, wherein physical slots, include all slots numbered sequential, while logical slots include only slots that can be allocated to sidelink (e.g., uplink slots, or slots with enough uplink symbols for sidelink transmission) numbered sequentially. Timing parameters (e.g., $T_s$, $T_e$, $T_{min}$ and $T_{max}$) can be provided in units of time, e.g., in seconds or milliseconds, and/or can be provided in units of physical slots depending on the numerology of the sidelink, and/or can be provided in logical slots. Different units can be used for different timing parameters. The conversion of logic slots to physical time (if needed) and vice versa can follow the release 16 NR equation, i.e., $$T'_{logical} = \left\lceil \frac{N}{20 \text{ ms}} \times T_{ms} \right\rceil$$

where $T_{ms}$ is a period in milliseconds, $T'_{logical}$ is the corresponding number of logical slots, and N is the number of slots that can be used for SL within a 20 ms period.

$T_{min}$ and $T_{max}$ can be specified by system specifications and/or configured/updated by higher layer RRC signaling and/or MAC CE signaling and/or L1 control signaling. In some cases, these parameters can be determined implicitly, e.g., based on the physical design of a channel, e.g., the maximum time (slot number) difference between the resource of a current transmission and that of the latest-in-time resource signaled in the SCI. In other cases, the timing parameter can be derived based on other parameters such as UE processing latencies and/or transmission delays and/or other parameters signaled by RRC signaling and/or MAC CE signaling and/or L1 control signaling.

The number of single-slot resources that can be signaled/reserved in an SCI, with random resource selection, can be specified by system specifications and/or configured/updated by higher layer RRC signaling and/or MAC CE signaling and/or L1 control signaling.

Figure 18:
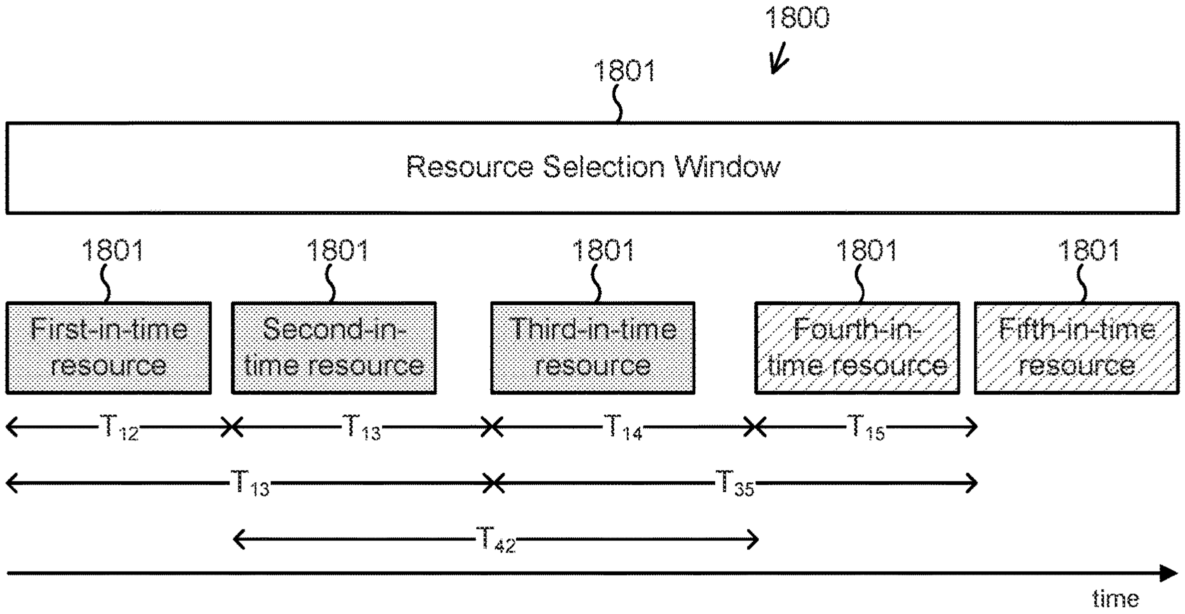

A UE can randomly select multiple sidelink resources within the resource selection window. The resources are ordered in time in ascending time order 1800 as shown in FIG. 18. The random selection of single-slot resources can be subject to the time restriction as described previously, and any additional restrictions. The first-in-time randomly selected resource is used for the initial transmission. In FIG. 18, within a resource selection window (1801), five single-slot resource (as an example) are randomly selected and ordered in time (e.g., 1801, 1802, 1803, 1804 and 1805 respectively). The number of single-slot resources that the UE randomly selects within a resource selection window can be specified by system specifications and/or configured/updated by higher layer RRC signaling and/or MAC CE signaling and/or L1 control signaling and/or left for UE's implementation possibly within a certain range.

In the example of FIG. 18, within an SCI transmission 3 single-slot resources can be signaled/reserved. The single-slot resource of the current transmission and the single-slot resources of the next (in time) two resources that can be used for a re-transmission or for a new transmission. The time between any two consecutive single-slot resources should meet the minimum timing requirement $T_{min}$. Therefore:

Time between first-in-time single-slot resource and second-in-time single-slot resource $T_{12}$ Time between second-in-time single-slot resource and third-in-time single-slot resource $T_{23} \geq T_{min}$.

Time between third-in-time single-slot resource and fourth-in-time single-slot resource $T_{34} \geq T_{min}$.

Time between fourth-in-time single-slot resource and fifth-in-time single-slot resource $T_{45} \geq T_{min}$.

In this example, there are three single-slot resources that can be signaled/reserved in an SCI including the single-slot resource of the current transmission. Therefore, the time difference between each single-slot resource and the next-next single-slot resource (in time) should meet the maximum timing requirement. Therefore:

Time between first-in-time single-slot resource and third-in-time single-slot resource $T_{13} \leq T_{max}$.

Time between second-in-time single-slot resource and fourth-in-time single-slot resource $T_{24} \leq T_{max}$.

Time between third-in-time single-slot resource and fifth-in-time single-slot resource $T_{34} \leq T_{max}$.

Figure 19:
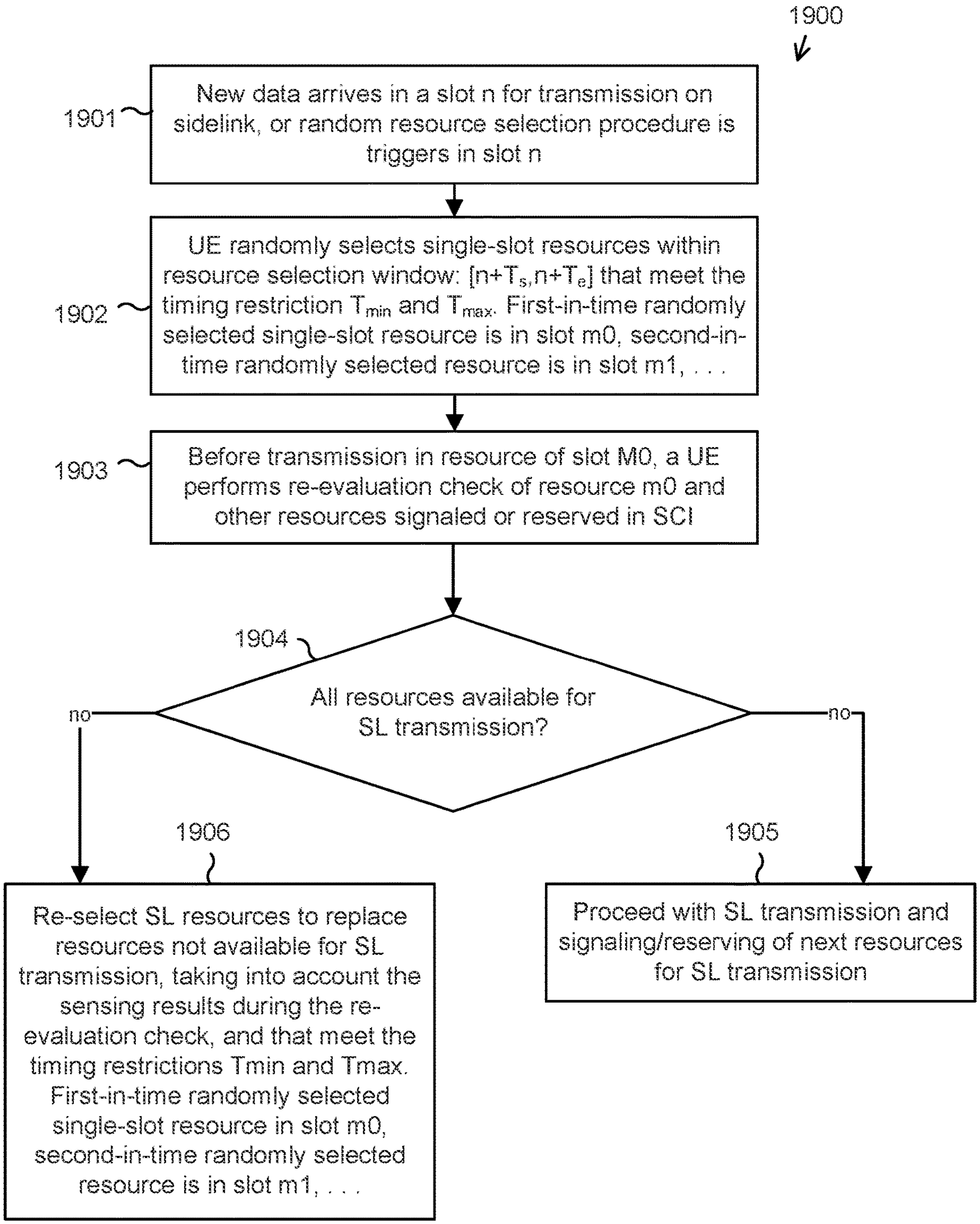
FIG. 19 is a high level flowchart illustrating an example procedure for random selection of single-slot resources based on the examples presented in this disclosure.

FIG. 19 is a diagram of the procedure 1900 for random selection of single-slot resources.

In step 1901, a new sidelink packet arrives in slot n, the sidelink random resource selection procedure is triggered in slot n.

In step 1902, the UE randomly selects single slot-resources (e.g., can be selected without any sensing) within a resource selection window [n+$T_s$, n+$T_e$], that satisfy the timing restrictions, e.g., $T_{min}$ and $T_{max}$ and any other restrictions. The randomly selected single-slot resources are ordered in time, m0 is the slot of the first-in-time randomly selected single-slot resource; m1 is the slot of the second-in-time randomly selected single-slot resource, . . . .

Before the initial transmission on single-slot resource in slot m0, a reevaluation check takes place as illustrated in step 1903. The details of the reevaluation check are described in component 6.

In step 1904, a UE determines if all the SL single-slot resources to be signaled in the SCI transmission are available, i.e., not reserved by another SL UE. If yes, proceed to 1905. If no, proceed to 1906.

In step 1905, a UE can proceed with the SL transmission on the first-in-time single-slot resource in slot m0, and signaling additional resources (i.e., next in time selected single-slot resources).

In step 1906, a UE re-selects single-slot resources for the resources that are not available for sidelink transmission taking into account the sensing results during the reevaluation check. The selected resources shall satisfy the timing requirements. Details of this step are described in component 6.

In one variation, example 0.1, of the procedure described in FIG. 19, when a new packet arrives for sidelink transmission in slot n, the packet is segmented into K physical layer transmissions on PSSCH. The UE can randomly select L sets of single-slot resources. Wherein, L≤K or L=K. Each one of the L sets of the randomly selected single-slot resources satisfies the timing restrictions previously mentioned and any other sidelink restrictions. A segment of the K segments is mapped to one of the L sets of randomly selected single-slot resources, wherein that set of randomly selected single-slot resources is used to transmit/re-transmit that segment on a PSSCH channel. In this example, L segments can be transmitted/re-transmitted in parallel.

In another variation, example 0.2, of the procedure described in FIG. 19, when a new packet arrives for sidelink transmission in slot n, the packet is segmented into K physical layer transmissions on PSSCH. The UE can randomly select a set of single-slot resources. The segments are transmitted sequentially; a first segment is transmitted on the first-in-time randomly selected single-slot resource, the first segment is re-transmitted (if needed) on the next-in-time single-slot resource(s), when the first segment is successfully transmitted and/or reaches its maximum number of transmissions, the next segment can be transmitted on the next-in-time randomly selected single-slot resource that could have been previously signaled/reserved and so on. Additional randomly selected single-slot resources can be included as the resource selection window shifts in time to larger time values, within the packet delay budget.

In a variation, example 0.2.1, of example 0.2 a maximum number of segments $K_{max}$ can be transmitted on previously signaled/reserved single-slot resources, before a new random selection procedure is initiated with a single-slot sidelink resource for an initial transmission of the next segment that has not been previously signaled/reserved. Alternatively, or additionally, a maximum number of single-slot resources $S_{max}$ that have been previously signaled/reserved can be used for sidelink transmission, after which a new random selection procedure is initiated, wherein the first-in-tine single-slot resource has not been previously signaled/reserved. $K_{max}$ and/or $S_{max}$ can be specified by system specifications and/or configured/updated by higher layer RRC signaling and/or MAC CE signaling and/or L1 control signaling.

In yet another variation, example 0.3, of the procedure described in FIG. 19, when a new packet arrives for sidelink transmission in slot n, the packet is segmented into K physical layer transmissions on PSSCH. The UE can randomly select a set of single-slot resources. The segments are transmitted sequentially; a first segment is transmitted on the first-in-time randomly selected single-slot resource, the first segment is re-transmitted (if any) on the next-in-time single-slot resource(s), when the first segment is successfully transmitted and/or reaches a maximum number of transmissions, a new random selection procedure is triggered for the transmission of the next segment. If sensing results from a prior reevaluation check are available, the sensing results can be taken into account during the random selection procedure. This procedure is repeated unit there is no more sidelink data to transmit.

In yet another variation, example 0.4, of the procedure described in FIG. 19, examples 0.1 and 0.2 are combined, wherein when a new packet arrives for sidelink transmission in slot n, the packet is segmented into K physical layer transmissions on PSSCH. The UE can randomly select L sets of single-slot resources, where L≤K. A first L segments of the K segments are each transmitted on one of the L sets of randomly selected single-slot resources. When a segment on a set of randomly selected single-slot resources is successfully transmitted and/or reaches its maximum number of transmissions, the next segment can be transmitted on the next-in-time randomly selected single-slot resources of that set.

Figure 19A:
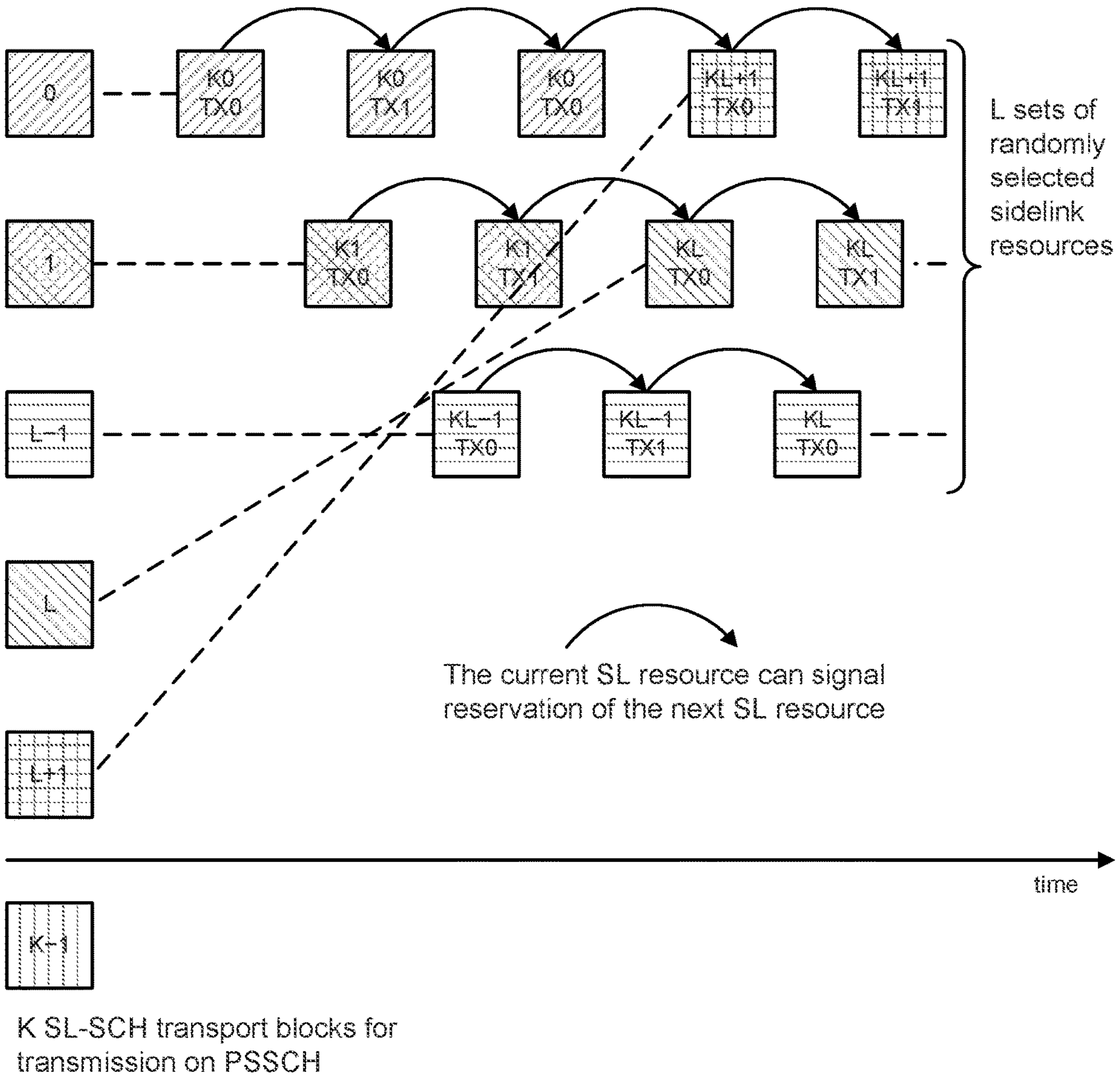
FIG. 19A illustrates transport blocks for transmission on the randomly selected single-slot resources based on such examples.

In FIG. 19A, as an example, K SL-SCH transport blocks are available for transmission on PSSCH. There are L randomly selected sets of sidelink resources. Within each set, after the first-time-in resource of each set, each resource is previously signaled and reserved by a prior SL resource on that set, creating a chain of resources for each set. There are special cases that can lead to this chain being broken such as preemption or congestion control, however, for this example we assume that chain continuity is maintained. Initially, SL-SCH_0 is transmitted using the resources of set 0, SL-SCH_1 is transmitted using the resources of set 1, . . . SL-SCH_L−1 is transmitted using the resources of set L−1. After an SL-SCH is successfully transmitted on a set of randomly selected SL resources, the next available SL-SCH is transmitted using the next resources of that set. For example, in FIG. 19A, SL-SCH_1 is transmitted on set 1 and after two transmissions is successfully received, SL_SCH_L is then transmitted on the next resource of set 1. Similarly, SL-SCH_0 is transmitted on set 0 and after three transmissions is successfully received, SL_SCH_L+1 is then transmitted on the next resource of set 0.

Figure 20:
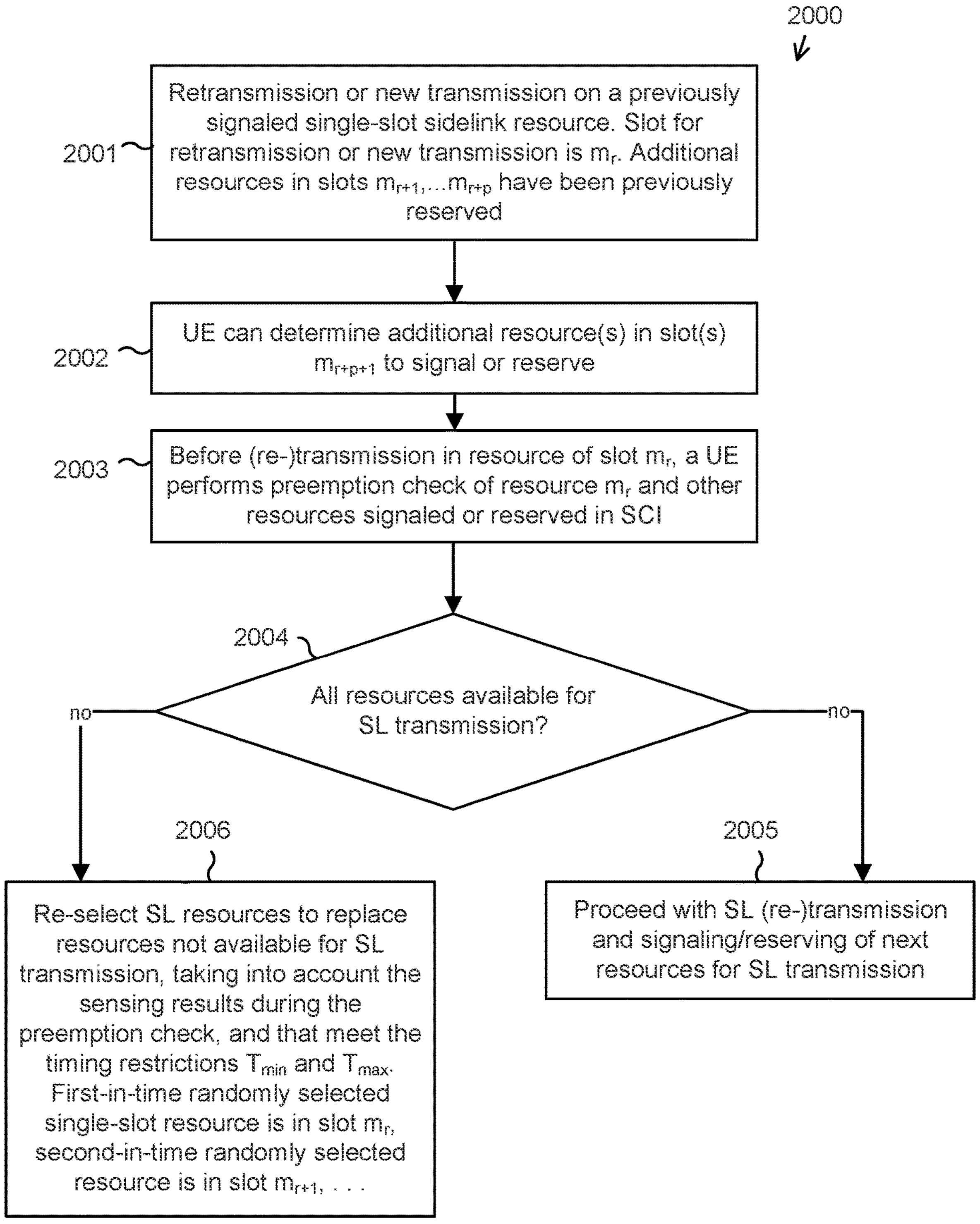
FIG. 20 is a high level flowchart illustrating an example procedure for random selection with preemption of previously signaled/reserved single-slot resources based on the examples presented in this disclosure.

FIG. 20 is a diagram of the procedure for random selection with preemption of previously signaled/reserved single-slot resources.

In step 2001, a UE determines a HARQ re-transmission or a new transmission in a single-slot resource that has been previously signaled/reserved. The single-slot resource is in slot $m_r$. Additionally, the UE could have signaled/reserved single-slot resources in slots $m_{r+1} \ldots m_{r+p}$.

In step 2002, the UE can determine additional single-slot resource(s) the UE may signal/reserve in the next SCI transmission (if any). The single-slot resource(s) are in slot(s) $m_{r+p+1} \ldots$. These resources may have been previously randomly selected, but not signaled/reserved, or maybe randomly selected in the current iteration, wherein the random selection is as described in FIG. 17, wherein slot n is the slot in which the random selection procedure for the new randomly selected resources occurs. The new randomly selected single slot-resources within a resource selection window $[n+T_s, n+T_e]$, satisfy the timing restrictions, e.g., $T_{min}$ and $T_{max}$ and any other restrictions. In addition, the new randomly selected single-slot resources are after any previously signaled/reserved single-slot resources, i.e., single-slot resources in slots $m_{r+1} \ldots m_{r+p}$. The new randomly selected single-slot resources are ordered in time, $m_{r+p+1}$ is the slot of the first-in-time new randomly selected single-slot resource; $m_{r+p+2}$ is the slot of the second-in-time new randomly selected single-slot resource, . . . .

Before the (re-)transmission on single-slot resource in slot $m_r$, a preemption check takes place as illustrated in step 2003. The details of the preemption check are described in component 7. For single-slot resources that have not been previously signaled/reserved, this is a reevaluation check.

In step 2004, a UE determines if all the SL single-slot resources to be signaled in the SCI transmission are available, i.e., not reserved by another SL UE. If yes, proceed to 2005. If no, proceed to 2006.

In step 2005, a UE can proceed with the SL (re-)transmission on the single-slot resource of slot $m_r$, which is the first-in-time resource for the current (re-)transmission, and signaling additional resources (i.e., next-in-time selected single-slot resources).

In step 2006, a UE re-selects single-slot resources for the resources that are not available for sidelink transmission taking into account the sensing results during the preemption check and/or reevaluation check. The selected resources shall satisfy the timing requirements. Details of this step are described in component 7.

In one example, example 0.5.1, of the preemption procedure for randomly selected resources of FIG. 20, previously signaled/reserved single-slot resources can be used only for retransmissions, e.g., HARQ retransmissions of previously transmitted sidelink data. A new transmission of sidelink data requires a new random selection of single-slot resources as described in FIG. 19.

In another example, example 0.5.2, of the preemption procedure for randomly selected resources of FIG. 20, previously signaled/reserved single-slot resources can be used for new transmissions as well as retransmissions, e.g., HARQ retransmissions of previously transmitted sidelink data. In some cases, a maximum number of new transmissions using single-slot resources that have been previously signaled/reserved and/or a maximum number of single-slot resources that can be previously signaled/reserved is determined, as described in example 0.2.1, after which, a new random selection procedure can take place.

In the previous examples and embodiments as well as those of the following components, a single-slot resource can be replaced by a multi-slot resource, wherein a same sidelink transmission is repeated across multiple slots, or one sidelink transmission is transmitted across resources in multiple slots. For example, transmission across the multiple slots can be on the same beam, or in a different beam for each slot. The number of slots in a multi-slot resource can be specified by system specifications and/or configured/updated by higher layer RRC signaling and/or MAC CE signaling and/or L1 control signaling.

In the previous examples and embodiments as well as those of the following components, a single-slot resource can be replaced by a sub-slot resource, wherein a sidelink transmission is transmitted in a sub-slot. A sub-slot can include one or more OFDMA symbols. The size of the sub-slot (e.g., number of symbols) can be specified by system specifications and/or configured/updated by higher layer RRC signaling and/or MAC CE signaling and/or L1 control signaling.

In the previous examples and embodiments as well as those of the following components, a single-slot resource can be replaced by a multi-sub-slot resource, wherein a same sidelink transmission is repeated across multiple sub-slots, or one sidelink transmission is transmitted across resources in multiple sub-slots. A sub-slot can include one or more OFDMA symbols. For example, transmission across the multiple sub-slots can be on the same beam, or in a different beam for each sub-slot. The number of sub-slots in a multi-sub-slot resource can be specified by system specifications and/or configured/updated by higher layer RRC signaling and/or MAC CE signaling and/or L1 control signaling. The size of the sub-slot (e.g., number of symbols) can be specified by system specifications and/or configured/updated by higher layer RRC signaling and/or MAC CE signaling and/or L1 control signaling. The sub-slots can be in a same slot or can span multiple slots.

In the previous examples and embodiments as well as those of the following components, reevaluation and/or preemption can be enabled or disable for random sidelink resource selection. Furthermore, the signaling/reservation of future sidelink resources by an SCI format can be enabled or disabled, when disabled only the resource of a current transmission is signaled in an SCI format, when enabled the resource of the current transmission and the next (re-) transmission(s) can be signaled in an SCI format. The enabling/disabling of reevaluation and/or preemption and/or signaling/reservation of future sidelink resources by an SCI format can be configured/updated by higher layer RRC signaling and/or MAC CE signaling and/or L1 control signaling.

The previous examples and embodiments as well as the following components, can be extended to partial sensing, i.e., reevaluation check and preemption check for partial sensing-based resource selection, wherein partial sensing resource selection replaces random resource selection.

Component 6: Reevaluation Check for First-In Time Sidelink Resource with Random Resource Selection For the arrangement illustrated in FIG. 21, n is the slot when data for sidelink transmission becomes available, or sidelink data transmission triggered, or a new random selection procedure for already available sidelink data is triggered.

m0 is the slot of first-in-time randomly selected single-slot sidelink resource within the resource selection window. Slot m0 is the would-be slot for the initial sidelink transmission, for data arriving in slot n, or a random sidelink resource selection procedure triggered in slot n.

m1 be the slot of second-in-time randomly selected single-slot sidelink resource within the resource selection window. Slot m1 is the would-be slot for the next sidelink (re-)transmission, for data arriving in slot n, or a sidelink random resource selection procedure triggered in slot n or data associated with a random resource selection in slot n.

m0 and m1 satisfy timing restrictions and other restrictions as previously mentioned.

A reevaluation check for the sidelink transmission in a slot can occur at least in slot $m0-T_3$, wherein $T_3$ can be specified by system specifications and/or configured/updated by higher layer RRC signaling and/or MAC CE signaling and/or L1 control signaling. $T_3$ can be determined by UE implementation or UE capability not to exceed a value specified by system specifications and/or configured/updated by higher layer RRC signaling and/or MAC CE signaling and/or L1 control signaling. A UE can perform a reevaluation check in one or more slots, as long as one of the reevaluations is in slot $m0-T_3$, or possibly a later in time slot than slot $m0-T_3$, wherein $T_3$ can be specified by system specifications and/or configured/updated by higher layer RRC signaling and/or MAC CE signaling and/or L1 control signaling. A reevaluation check determines if the selected single-slot resource in slot m0 is available for sidelink transmission, or if the selected single-slot resource in slot m0 has been reserved by another UE based on the sensing results from the sensing window as described in TS 38.214, i.e., the first step of the resource selection procedure. Similarly, reevaluation check can be performed for selected single-slot resources in other slots, e.g., slot m1.

For a reevaluation check of a random resource selection procedure, the UE performs sensing during a sensing window as illustrated in FIG. 21. The last slot of the sensing window ("Sen end" in FIG. 21) can be slot $c-T_{sen}$, where c is the slot of the reevaluation check, and $T_{sen}$ is the sensing processing time. $T_{sen}$ can be specified by system specifications and/or configured/updated by higher layer RRC signaling and/or MAC CE signaling and/or L1 control signaling. $T_{sen}$ can be determined by UE implementation or UE capability not to exceed a value specified by system specifications and/or configured/updated by higher layer RRC signaling and/or MAC CE signaling and/or L1 control signaling.

In one example 1.1, the first slot of the sensing window ("Sen strt" in FIG. 21) can be slot $m0-W$, where m0 is the slot of the first-in-time randomly selected single-slot resource and W is the time (e.g., in slots) between the start of the sensing window and the slot of the first-in-time randomly selected single-slot resource. In one example 1.1.1, W is the latest time (slot) of a resource that can be signaled (reserved) by the sidelink control information (SCI), for example in release 16, the latest slot that can be signaled (reserved) by an SCI is 31 slots away from the slot of the SCI transmission. In another example 1.1.2, W can be specified by system specifications and/or configured/updated by higher layer RRC signaling and/or MAC CE signaling and/or L1 control signaling. W can be determined by UE implementation or UE capability not to be less than a value specified by system specifications and/or configured/ updated by higher layer RRC signaling and/or MAC CE signaling and/or L1 control signaling.

In another example 1.2, the value of W and m0 is such that the start of the sensing window (i.e., slot "Sen strt") would-be at or earlier than slot n. In this case, the sensing window can start at slot n+1. Alternatively, the sensing window can start at slot n, i.e., in this example the sensing window cannot start earlier than slot n or slot n+1 where sidelink transmission becomes available, or sidelink data transmission is triggered, or a new random selection procedure is triggered.

In yet another example 1.2.1, a minimum time gap can be required between slot n and the first slot of the sensing window. This gap be denoted as $T_{sen-gap}$. If the value of W and m0 is such that the start of the sensing window (i.e., slot "Sen strt") is at or earlier than slot $n+T_{sen-gap}$, in this case, the sensing window can start at slot $n+T_{sen-gap}+1$. $T_{sen-gap}$ can be specified by system specifications and/or configured/updated by higher layer RRC signaling and/or MAC CE signaling and/or L1 control signaling. $T_{sen-gap}$ can be determined by UE implementation or UE capability and/or not to exceed a value specified by system specifications and/or configured/updated by higher layer RRC signaling and/or MAC CE signaling and/or L1 control signaling.

In another example 1.3, the first slot of the sensing window ("Sen strt" in FIG. 21) is after slot n by a minimum gap $T_{sen-gap}$ in this case, the sensing window can start at slot $n+T_{sen-gap}+1$. $T_{sen-gap}$ can be specified by system specifications and/or configured/updated by higher layer RRC signaling and/or MAC CE signaling and/or L1 control signaling. $T_{sen-gap}$ can be determined by UE implementation or UE capability and/or not to exceed a value specified by system specifications and/or configured/updated by higher layer RRC signaling and/or MAC CE signaling and/or L1 control signaling. The end of the sensing can be slot $m0-T_3-T_{sen}$.

In the previous examples, the slots can be numbered (indexed) as physical slots or logical slots, wherein physical slots, include all slots numbered sequential, while logical slots include only slots that can be allocated to sidelink (e.g., uplink slots, or slots with enough uplink symbols for sidelink transmission) numbered sequentially. Timing parameters (e.g., $T_{sen}$, W, and $T_{sen-gap}$) can be provided in units of time, e.g., in seconds or milliseconds, and/or can be provided in units of physical slots depending on the numerology of the sidelink, and/or can be provided in logical slots. Different units can be used for different timing parameters. The conversion of logic slots to physical time (if needed) and vice versa can follow the release 16 NR equation, i.e.:

$$T'_{logical} = \left\lceil \frac{N}{20\text{ ms}} \times T_{ms} \right\rceil$$

where $T_{ms}$ is a period in milliseconds, $T'_{logical}$ is the corresponding number of logical slots, and N is the number of slots that can be used for SL within a 20 ms period.

If the result of the reevaluation check indicates that the selected single-slot resource in slot m0 is available for initial transmission, the UE can proceed with the sidelink transmission on the randomly selected and re-evaluated sidelink resource.

If the result of the reevaluation check indicates that the selected single-slot resource in slot m0 is NOT available for initial transmission, the UE selects a different single-slot resource for initial transmission. One of the following examples can follow:

- In one example 1.3.1, the UE performs a new random selection in slot c of FIG. 21. A new random selection window is determined as described in FIG. 17, wherein slot c of FIG. 21 becomes slot n of FIG. 17.
- In another example 1.3.2, the UE randomly selects a different single-slot resource for the initial-transmission, excluding resources not available for sidelink transmission as determined by the sensing results. A UE is expected to maintain the timing restrictions with any other previously selected single-slot resources. If timing restriction cannot be kept, the previous selected single-slot resources that cannot maintain the timing-restriction can be re-selected to ensure that timing restrictions are kept. It is up to the UE implementation to maintain the timing restriction, for example if a new resource that is selected for the sidelink resource in slot m0 does not meet the timing restriction for single-slot resource in slot m1, the single-slot resource of slot m1 can be re-selected. Similarly, for a single slot resource in slots, m2, . . . (as applicable). Alternatively, the UE can drop the resource in slot m0 and make the resource of slot m1 the new m0, the resource of slot m1 should be available for sidelink transmission.
- In example 1.3.3, the UE can be configured to operate according to example 1.3.1 or according to example 1.3.2.

If the result of the reevaluation check indicates that the single-slot resource in slot m1, or any other selected single-slot resource in a later slot is available for sidelink transmission, the resources can be signaled/reserved in the first transmission.

If the result of the reevaluation check indicates that the single-slot resource in slot m1, or any other selected single-slot resource in a later slot is NOT available, different resources can be selected from the available resources, with timing restrictions maintained, those resources can be reserved in the first transmission. It is up to the UE implementation to maintain the timing restriction, for example if a new resource that is selected for the sidelink resource in slot m1 or a later slot does not meet the timing restriction for single-slot resource in another slot, the single-slot resource of the other slot can be re-selected. Alternatively, the UE can drop the resource in a slot e.g., slot m1 and make the resource of the next slot e.g., slot m2 the new resource for the dropped slot e.g., m1, the resource of the next slot e.g., slot m2 should be available for sidelink transmission.

Component 7: Preemption Check for a Previously Signaled/Reserved Resource with Random Resource Selection For the arrangement illustrated in FIG. 22, $m_r$ is the slot of first-in-time randomly previously signaled/reserved single-slot sidelink resource. Slot $m_r$ is the would-be slot for the current (re-)transmission.

In one example slot $m_r$ can only be used for a re-transmission of previously transmitted data, e.g., HARQ re-transmission.

In another example slot $m_r$ can be used for a new transmission or for a retransmission of previously transmitted data, e.g., HARQ re-transmission.

In another example, the network/gNB can configure a UE through RRC signaling and/or through MAC CE signaling and/or through L1 control signaling whether to use slot $m_r$ for only a re-transmission of previously transmitted data or for both new transmissions as well as re-transmission of previously configured data.

$m_{r+1}$ is the slot of second-in-time previously signaled/reserved single-slot sidelink resource. Slot $m_{r+1}$ is the would-be slot for the next sidelink (re-)transmission.

$m_{r+p}$ is the slot of the last-in-time previously signaled/reserved single-slot sidelink resource. Slot $m_{r+p}$) is the would-be slot for the next pth sidelink (re-)transmission.

As described in FIG. 20, step 2002, the UE can determine additional single-slot resource(s) the UE may signal/reserve in the next SCI transmission (if any). The single-slot resource(s) are in slot(s) $m_{r+p+1}$ . . . .

- These resources may have been previously randomly selected, but not signaled/reserved.
- Alternatively, these resources may be randomly selected in the current iteration, wherein the random selection is as described in FIG. 17. As shown in FIG. 22, the random resource selection occurs in the preemption check slot, i.e., slot c. It is also possible the random selection occurs in a slot different from slot c, and is left to the UE's implementation. When the random selection occurs in slot c, the new randomly selected single slot-resources are within a resource selection window [c+$T_s$, c+$T_e$], satisfying the timing restrictions, e.g., $T_{min}$ and $T_{max}$ and any other restrictions. In addition, the new randomly selected single-slot resources are after any previously signaled/reserved single-slot resources, i.e., single-slot resources in slots $m_{r+1}$ . . . $m_{r+p}$ The new randomly selected single-slot resources are ordered in time, $m_{r+p+1}$ is the slot of the first-in-time new randomly selected single-slot resource; $m_{r+p+2}$ is the slot of the second-in-time new randomly selected single-slot resource, . . . .

A preemption check for the sidelink transmission in a slot can occur at least in slot $m_r$–$T_3$, where $T_3$ can be specified by system specifications and/or configured/updated by higher layer RRC signaling and/or MAC CE signaling and/or L1 control signaling. $T_3$ can be determined by UE implementation or UE capability not to exceed a value specified by system specifications and/or configured/updated by higher layer RRC signaling and/or MAC CE signaling and/or L1 control signaling. A UE can perform a preemption check in one or more slots, as long as one of the reevaluations is in slot $m_0$–$T_3$, or possibly a later in time slot than slot $m_0$–$T_3$, wherein $T_3$ can be specified by system specifications and/or configured/updated by higher layer RRC signaling and/or MAC CE signaling and/or L1 control signaling. Preemption check determines if the selected single-slot resource in slot $m_r$ is available for sidelink transmission, or if the selected single-slot resource in slot $m_r$ has been reserved by another UE (i.e., pre-empting UE) based on the sensing results from the sensing window as described in TS 38.214, and based on the priority of the pre-empting UE, the preempted UE and a configured threshold. $T_3$ can be the same as that used for the reevaluation check (see FIG. 22) or can be a separate parameter. Similarly, preemption check can be performed for selected single-slot previously signaled/reserved resources in other slots, e.g., slot $m_{r+1}$ . . . $m_{r+p}$ Furthermore, a reevaluation check can be performed for the new randomly selected single-slot resources to be signaled/reserved in the current SCI transmission, e.g., single-slot resources in slot $m_{r+p+1}$ . . . , as long slot $m_{r+p+1}$ is within the range of the resources signaled/reserved by an SCI in the sensing window.

For a preemption check, if the pre-selected and reserved resource is NOT available in the candidate sidelink resource set based on sensing over a sensing window, and the resource is excluded from the candidate resource set due to an SCI, associated with a priority value $P_{RX}$, having an RSRP exceeding a threshold, and the priority value of the sidelink resource being checked for preemption is $P_{TX}$, then

- If the priority value $P_{RX}$ is less than a higher-layer configured threshold and the priority value $P_{RX}$ is less than the priority value $P_{TX}$. The pre-selected and reserved sidelink resource is preempted. A new sidelink resource is to be re-selected. Note that, a lower priority value indicates traffic of higher priority.
- Else, the resource is used/signaled for sidelink transmission.

For a preemption check, the UE performs sensing during a sensing window as illustrated in FIG. 22. The last slot of the sensing window ("Sen end" in FIG. 22) can be slot c–$T_{sen}$, where c is the slot of the preemption check and $T_{sen}$ is the sensing processing time. $T_{sen}$ can be specified by system specifications and/or configured/updated by higher layer RRC signaling and/or MAC CE signaling and/or L1 control signaling. $T_{sen}$ can be determined by UE implementation or UE capability not to exceed a value specified by system specifications and/or configured/updated by higher layer RRC signaling and/or MAC CE signaling and/or L1 control signaling. $T_{sen}$ can be the same as that used for the reevaluation check (see FIG. 21) or can be a separate parameter.

In one example 2.1, the first slot of the sensing window ("Sen strt" in FIG. 21) can be slot $m_r$–W, where $m_r$ is the slot of the first-in-time previously signaled/reserved single-slot resource, and W is the time (e.g., in slots) between the start of the sensing window and the slot of the first-in-time previously signaled/reserved single-slot resource. In one example 2.1.1, W is the latest time (slot) of a resource that can be signaled by the sidelink control information (SCI), for example in release 16, the latest slot that can be signaled (reserved) by an SCI is 31 slots away from the slot of the SCI transmission. In another example 2.1.2, W can be specified by system specifications and/or configured/updated by higher layer RRC signaling and/or MAC CE signaling and/or L1 control signaling. W can be determined by UE implementation or UE capability not to be less than a value specified by system specifications and/or configured/updated by higher layer RRC signaling and/or MAC CE signaling and/or L1 control signaling. W can be the same as that used for the reevaluation check (see FIG. 21) or can be a separate parameter.

In the previous examples, the slots can be numbered (indexed) as physical slots or logical slots, wherein physical slots, include all slots numbered sequential, while logical slots include only slots that can be allocated to sidelink (e.g., uplink slots, or slots with enough uplink symbols for sidelink transmission) numbered sequentially. Timing parameters (e.g., $T_s$, $T_e$, $T_{sen}$ and W) can be provided in units of time, e.g., in seconds or milliseconds, and/or can be provided in units of physical slots depending on the numerology of the sidelink, and/or can be provided in logical slots. Different units can be used for different timing parameters. The conversion of logic slots to physical time (if needed) and vice versa can follow the release 16 NR equation, i.e.:

$$T'_{logical} = \left\lceil \frac{N}{20\text{ ms}} \times T_{ms} \right\rceil$$

where $T_{ms}$ is a period in milliseconds, $$T'_{logical}$$

is the corresponding number of logical slots, and N is the number of slots that can be used for SL within a 20 ms period.

If the result of the pre-emption check indicates that the previously signaled/reserved single-slot resource in slot $m_r$ is available for the current (re-)transmission, the UE can proceed with the sidelink (re-)transmission on the previously signaled/reserved and pre-emption checked sidelink resource.

If the result of the pre-emption check indicates that the selected single-slot resource in slot $m_r$ is NOT available for current (re-)transmission, the UE selects a different single-slot resource for the current (re-)transmission. One of the following examples can be followed:

In one example 2.3.1, the UE performs a new random selection in slot c of FIG. 22. A new random selection window is determined as described in FIG. 17, wherein slot c of FIG. 22 becomes slot n of FIG. 17.

In another example 2.3.2, the UE randomly selects a different single-slot resource for the current (re-)transmission, excluding resources not available for sidelink transmission as determined by the sensing results. A UE is expected to maintain the timing restrictions with any other previously signaled/reserved single-slot resource or previously selected single-slot resource that was not previously signaled/reserved. If a timing restriction cannot be kept, one of the following examples can be followed:

In one example 2.3.2.1, the previously signaled/reserved single-slot resources or previously selected single-slot resources that were not previously signaled/reserved, and that cannot maintain the timing-restriction can be re-selected to ensure that timing restrictions are kept. It is up to the UE implementation to maintain the timing restriction, for example if a new resource that is selected for the sidelink resource in slot $m_r$ does not meet the timing restriction for single-slot resource in slot $m_{r+1}$, the single-slot resource of slot $m_{r+1}$ can be re-selected. Similarly, for a single slot resource in slots, $m_{r+2}$, . . . (as applicable). Alternatively, the UE can drop the resource in slot $m_r$ and make the resource of slot $m_{r+1}$ the new $m_r$, the resource of slot $m_{r+1}$ should be available for sidelink transmission (i.e., not preempted).

In another example 2.3.2.2, the previously signaled/reserved single-slot resources that are available for sidelink-retransmission (i.e., not preempted) are not re-selected. The previously signaled/reserved single-slot resources that are NOT available (i.e., preempted) for sidelink-retransmission can be re-selected. The previously selected single-slot resources that were not previously signaled/reserved, and that cannot maintain the timing-restriction can be re-selected to ensure that timing restrictions are kept. It is up to the UE implementation to maintain the timing restriction, for example if a new resource that is selected for the sidelink resource in slot $m_r$ does not meet the timing restriction for single-slot resource in slot $m_{r+1}$, the single-slot resource of slot $m_{r+1}$ cannot be re-selected if available for sidelink retransmission. The UE, for example, can drop the resource in slot $m_r$ and make the resource of slot $m_{r+1}$ the new $m_r$, the resource of slot $m_{r+1}$ should be available for sidelink transmission (i.e., not preempted).

In another example 2.3.3, the UE can be configured by RRC signaling and/or MAC CE signaling and/or L1 control signaling to operate according to example 2.3.1 and/or according to example 2.3.2.1 and/or according to example 2.3.2.2.

If the result of the pre-emption check indicates that the single-slot resource in slot $m_{r+1}$, or any other previously signaled/reserved single-slot resource in a later slot is available for sidelink transmission, or if the result of the reevaluation check indicates that the single-slot resource in slot $m_{r+p+1}$ or any other later single-slot resource to be signaled/reserved in the current transmission is available for sidelink transmission, the resources can be signaled/reserved in the current (re-)transmission.

If the result of the pre-emption check indicates that the single-slot resource in slot $m_{r+1}$, or any other previously signaled/reserved single-slot resource in a later slot is NOT available (i.e., that single-slot resource in slot $m_{r+1}$ has been preempted), different resources can be selected from the available resources, with timing restrictions maintained, those selected resources can be signaled/reserved in the current (re-)transmission. It is up to the UE implementation to maintain the timing restriction, one of the following examples can be followed:

In one example 2.4.1, the previously signaled/reserved single-slot resources or previously selected single-slot resources that were not previously signaled/reserved, and that cannot maintain the timing-restriction can be re-selected to ensure that timing restrictions are kept.

In another example 2.4.2, the previously signaled/reserved single-slot resources that are available (i.e., not preempted) for sidelink-retransmission are not re-selected. The previously signaled/reserved single-slot resources that are NOT available (i.e., preempted) for sidelink-retransmission can be re-selected. The previously selected single-slot resources that were not previously signaled/reserved, and that cannot maintain the timing-restriction can be re-selected to ensure that timing restrictions are kept. It is up to the UE implementation to maintain the timing restriction.

In another example 2.4.3, the UE can be configured, by RRC signaling and/or MAC CE signaling and/or L1 control signaling, to operate according to example 2.4.1 or according to example 2.4.2.

If the result of the reevaluation check indicates that the single-slot resource in slot $m_{r+p+1}$, or any other selected single-slot resource in a later slot, to be signaled/reserved in the current (re-)transmission, is NOT available, different resources can be selected from the available resources, with timing restrictions maintained, those selected resources can be reserved in the current (re-)transmission. It is up to the UE implementation to maintain the timing restriction.

Component 8 Resources Selected for Signaling/Reservation

In one example 3.1, the resources selected for signaling/reservation in an SCI for next (re-)transmissions are selected and re-selected randomly as previously described, with the timing restrictions e.g., $T_{min}$ and $T_{max}$, maintained.

In another example 3.2, if the first-in-time single-slot resource is in slot $m_0$ or in slot $m_r$ and starts in sub-channel $S_0$ or $S_r$ respectively for a current (re-)transmission, the resources for the next transmissions or re-transmissions are determined deterministic based on a rule with parameters that can be specified by system specifications and/or configured/updated by higher layer RRC signaling and/or MAC CE signaling and/or L1 control signaling.

In one example 3.2.1, the slots for the next-in-time single-slot resources are determined by an offset, e.g.:

$$m_1 = m_0 + m_{offset},\ m_2 = m_1 + m_{offset},\ \ldots$$

$$m_{r+1} = m_r + m_{offset},\ m_{r+2} = m_{r+1} + m_{offset},\ \ldots$$

The starting sub-channel of each single-slot resource can remain as $S_0$ or $S_r$ respectively. e.g.:

$$S_1 = S_0, S_2 = S_1, \ldots$$

$$S_{r+1} = S_r, S_{r+2} + S_{r+1}, \ldots$$

In another example 3.2.2, the slots for the next-in-time single-slot resource are determined by a time domain offsetm$_{offset}$, e.g.:

$$m_1 = m_0 + m_{offset}, m_2 = m_1 + m_{offset}, \ldots$$

$$m_{r+1} = m_r + m_{offset}, m_{r+2} = m_{r+1} + m_{offset}, \ldots$$

The starting sub-channel of the next-in-time single-slot resources are determined by a frequency domain offset $S_{offset}$, with wrap around, e.g.:

$$S_1 = (S_0 + S_{offset})\%(N_{subCH} - L_{subCH} + 1),$$

$$S_2 = (S_1 + S_{offset})\%(N_{subCH} - L_{subCH} + 1), \ldots$$

$$S_{r+1} = (S_r + S_{offset})\%(N_{subCH} - L_{subCH} + 1),$$

$$S_{r+2} = (S_{r+1} + S_{offset})\%(N_{subCH} - L_{subCH} + 1), \ldots$$

where "%" is the modulo operator ("x % N" equals the remainder from the division of x by N), $N_{subCH}$ is the number of sub-channels in a resource pool, and $L_{subCH}$ is the number of sub-channels in a single-slot resource.

In another example 3.2.3, the slots for the next-in-time single-slot resources are selected and re-selected randomly, with the timing restrictions e.g., $T_{min}$ and $T_{max}$ maintained.

The starting sub-channel of the next-in-time single-slot resource is determined by a frequency domain offset $S_{offset}$, with wrap around, e.g.:

$$S_1 = (S_0 + S_{offset})\%(N_{subCH} - L_{subCH} + 1),$$

$$S_2 = (S_1 + S_{offset})\%(N_{subCH} - L_{subCH} + 1), \ldots$$

$$S_{r+1} = (S_r + S_{offset})\%(N_{subCH} - L_{subCH} + 1),$$

$$S_{r+2} = (S_{r+1} + S_{offset})\%(N_{subCH} - L_{subCH} + 1), \ldots$$

In another example 3.2.4, the slots for the next-in-time single-slot resources are determined by a time domain offset $m_{offset}$ e.g.:

$$m_1 = m_0 + m_{offset}, m_2 = m_1 + m_{offset}, \ldots$$

$$m_{r+1} = m_r + m_{offset}, m_{r+2} = m_{r+1} + m_{offset}, \ldots$$

The starting sub-channel of the next-time single-slot resources are determined by random selection within each slot.

In another example 3.2.5, the operation of a UE according to the previous examples (example 3.1, and the sub-examples of example 3.2), can be determined by system specifications or can be configured, by RRC signaling and/or MAC CE signaling and/or L1 control signaling.

In the previous examples, $m_{offset}$, $S_{offset}$, $L_{subCH}$ and $N_{subCH}$ can be specified by system specifications and/or configured/updated by higher layer RRC signaling and/or MAC CE signaling and/or L1 control signaling. The configuration can be cell-specific, or resource pool-specific or UE-specific. For example, when the configuration is UE-specific a different sub-channel offset ($S_{offset}$) and/or slot offset ($m_{offset}$) can be configured for each user for randomization of the resources for the next (re-)transmissions between users. Alternatively, or additionally, the slot offset ($m_{offset}$) and/or sub-channel offset ($S_{offset}$) can be determined randomly for each user and each iteration, e.g., based on a random sequence generator (e.g., as described in section 5.2.1 of TS 38.211) wherein, the seed for the random sequence generator can be calculated based on a UE ID.

In the previous examples, a slot offset can also include a symbol offset, or can be replaced by a time offset.

In the previous examples, the slots can be numbered (indexed) as physical slots or logical slots, wherein physical slots, include all slots numbered sequential, while logical slots include only slots that can be allocated to sidelink (e.g., uplink slots, or slots with enough uplink symbols for sidelink transmission) numbered sequentially. Timing parameters (e.g., $m_{offset}$, $T_{min}$, and $T_{max}$) can be provided in units of time, e.g., in seconds or milliseconds, and/or can be provided in units of physical slots depending on the numerology of the sidelink, and/or can be provided in logical slots. Different units can be used for different timing parameters. The conversion of logic slots to physical time (if needed) and vice versa can follow the release 16 NR equation, i.e.:

$$T'_{logical} = \left\lceil \frac{N}{20 \text{ ms}} \times T_{ms} \right\rceil$$

where $T_{ms}$ is a period in milliseconds, $$T'_{logical}$$

is the corresponding number of logical slots, and N is the number of slots that can be used for SL within a 20 ms period.

In one example 3.3, and following the sub-examples of example 3.2, if a resource is re-selected due to a reevaluation check or a pre-emption check, other selected single-slot resources are re-selected following the rule for determining single-slot resources.

In one example 3.3.1, only the first-in-time resource for the current(re-)transmission can be re-selected. The remaining selected single-slot resources are re-selected following the rule for determining single-slot resources.

Any flowcharts above illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims.

None of the descriptions in this application should be read as implying that any particular element, step, or function is an essential element that must be included in the claims scope. The scope of patented subject matter is defined by the claims.

What is claimed is:

1. A method performed by a user equipment (UE) in a communication system, the method comprising:

identifying a starting slot for a partial sensing, wherein the starting slot for the partial sensing is defined by W slots earlier than a first slot;

identifying an end slot for the partial sensing, wherein the end slot for the partial sensing is defined by a first processing time and a second processing time earlier than the first slot and wherein the first processing time and the second processing time comprise at least one slot; and performing the partial sensing for resource allocation mode 2 starting from the starting slot to the end slot, wherein the first slot is defined based on a resource selection procedure triggered in a slot n.

2. The method of claim 1, wherein the W slots are 31 slots.

3. The method of claim 1, wherein the W slots are configured by a radio resource control (RRC) signaling.

4. The method of claim 1, wherein the first slot is a first candidate defined based on the resource selection procedure triggered in the slot n.

5. The method of claim 1, wherein the starting slot is a logical slot.

6. The method of claim 1, wherein:

the resource selection procedure is triggered for a re-evaluation check, and the first slot is further defined based on a first candidate slot starting from slot $n+T_3$, where $T_3$ is a time equal to the second processing time.

7. The method of claim 1, wherein:

the resource selection procedure is triggered for a pre-emption check, and the first slot is further defined based on a first candidate slot starting from slot $n+T_3$, where $T_3$ is a time equal to the second processing time.

8. A user equipment (UE) comprising:

a transceiver; and a processor operably coupled to the transceiver, the processor configured to:

identify a starting slot for a partial sensing, wherein the starting slot for the partial sensing is defined by W slots earlier than a first slot;

identify an end slot for the partial sensing, wherein the end slot for the partial sensing is defined by a first processing time and a second processing time earlier than the first slot and wherein the first processing time and the second processing time comprise at least one slot; and perform the partial sensing for resource allocation mode 2 starting from the starting slot to the end slot, wherein the first slot is defined based on a resource selection procedure triggered in a slot n.

9. The UE of claim 8, wherein the W slots are 31 slots.

10. The UE of claim 8, wherein the W slots are configured by a radio resource control (RRC) signaling.

11. The UE of claim 8, wherein the first slot is a first candidate defined based on the resource selection procedure triggered in the slot n.

12. The UE of claim 8, wherein the starting slot is a logical slot.

13. The UE of claim 8, wherein:

the resource selection procedure is triggered for a re-evaluation check, and the first slot is further defined based on a first candidate slot starting from slot $n+T_3$, where $T_3$ is a time equal to the second processing time.

14. The UE of claim 8, wherein:

the resource selection procedure is triggered for a pre-emption check, and the first slot is further defined based on a first candidate slot starting from slot $n+T_3$, where $T_3$ is a time equal to the second processing time.

* * * * *